United States Patent [19]
Hamstra et al.

[11] Patent Number: 5,185,863
[45] Date of Patent: Feb. 9, 1993

[54] BYTE-WIDE ELASTICITY BUFFER

[75] Inventors: James R. Hamstra, Shorewood, Minn.; Ronald S. Perloff, Poway; Louise Y. Yeung, Sunnyvale, both of Calif.

[73] Assignee: National Semiconductor Corporation, Santa Clara, Calif.

[21] Appl. No.: 444,619

[22] Filed: Dec. 1, 1989

[51] Int. Cl.⁵ .................. H04L 1/00; H04L 25/40; G08C 25/00
[52] U.S. Cl. .................. 395/250; 364/DIG. 1; 364/239.7; 364/260.1; 364/DIG. 2; 364/939.3
[58] Field of Search .................. 395/250

[56] References Cited

U.S. PATENT DOCUMENTS

| | | | |
|---|---|---|---|
| 4,688,210 | 8/1987 | Eizanhöfer et al. | 370/18 |
| 4,703,486 | 10/1987 | Bemis | 371/14 |
| 4,797,951 | 1/1989 | Duxbury et al. | 455/608 |
| 4,849,970 | 7/1989 | McCool | 370/100.1 |
| 4,945,548 | 7/1990 | Iannarone et al. | 375/4 |
| 4,979,107 | 12/1990 | McCool | 370/85.4 |
| 4,984,251 | 1/1991 | Perloff et al. | 375/38 |
| 5,043,981 | 8/1991 | Firoozmand et al. | 370/85.1 |
| 5,046,182 | 9/1991 | Hamstra et al. | 370/79 |

FOREIGN PATENT DOCUMENTS 0188111 1/1986 European Pat. Off. .

OTHER PUBLICATIONS

"Data Communication Jitter Remover", Research Disclosure, #285 Jan. 1988, p. 57, Disclosure #28581.

F. E. Ross, "FDDl-An Overview", *32th IEEE Computer Society International Conference*, Feb. 1987, pp. 23-27.

*Primary Examiner*—Dale M. Shaw
*Assistant Examiner*—Robert S. Hauser
*Attorney, Agent, or Firm*—Limbach & Limbach

[57] ABSTRACT

A network station's elasticity buffer includes a memory core together with write and read pointer logic. The memory core includes a START area and a CONTINUATION area which is a cyclic buffer. Under normal conditions, the read pointer follows the write pointer cyclically in the CONTINUATION area. However, upon detection of a start delimiter or upon station reset, the pointers recenter to the START area. Separate synchronizing logic is provided for each of the two recentering modes to reduce metastability problems caused by asynchronous sampling of data. A delay-by-one mechanism is built into the start delimiter mode synchronization scheme so that, under certain conditions, the read pointer is held in the CONTINUATION area for an additional read so an early sample of the read-start signal by the station's local clock while the read pointer is well behind the write pointer will not drop the last character of the previous frame when that frame is not separated from the next start delimiter by a sufficient interframe gap. A look-ahead-look-current detector insures that the there is not too much initial separation between the write pointer and the read pointer. A delay-GO mechanism is built into the reset mode synchronization scheme to prevent irregular dropping of line state characters when the local byte clock is trapped within the metastability window while clock drift is infinitesimal. The read pointer logic also includes a mechanism for preventing the delay-GO mechanism from creating too much initial separation between the write pointer and the read pointer.

10 Claims, 20 Drawing Sheets

BYTE-WIDE ELASTICITY BUFFER

BACKGROUND OF THE INVENTION

1. Field of the Invention

The present invention relates to data communications networks and, in particular, to an elasticity buffer that provides temporary character storage in a network station to compensate for differences in frequency between the station's local transmit clock and a data sampling clock recovered from the incoming data stream.

2. Discussion of the Prior Art

Communication between stations in a communications network occurs through the transmission of a series, or "frame", of information characters, with adjacent frames being separated by explicit or implicit start-stop code patterns. The use of a unique start pattern ("start delimiter") and a unique stop pattern ("end delimiter") allows the receiving station to identify the exact beginning and the exact end of each frame.

When information frames are being transmitted from one station in the network to another, the data sampling timing of the receiving station must be the same as or very close to the transmit timing of the transmitting station in order to achieve reliable information frame propagation. If there is a timing difference between the transmitting station and the receiving station, then data sampling at the receiver station will drift, causing eventual data sampling error at the limits of the information frames and, hence, system malfunctioning.

In some local area networks, and in almost all "asynchronous" communications links, each station samples incoming data received from an upstream transmitting station based upon a "receive" clock which is recovered from the incoming data signal. The receiving station, in turn, relies upon an indpendent "local" clock to retransmit the recovered data. Network synchronization may be maintained by utilizing an elasticity buffer in each station to provide temporary storage for the recovered data to compensate for phase and frequency differences between the recovered data sampling clock and the local transmit clock.

A particular type of data communications network is defined by the Fiber Distributed Data Interface (FDDI) protocol. The FDDI protocol is an American National Standard (ANS) for data transmission which applies to a 100 Mbits/sec. token ring network that utilizes an optical fiber transmission medium. The FDDI protocol is intended as a high performance interconnection among computers as well as among computers and their associated mass storage subsystems and other peripheral equipment.

Information is transmitted on an FDDI ring in frames that consist of a sequence of 5-bit data characters or "symbols", each symbol representing four data bits. Tokens are used to signify the right to transmit information frames between stations on the network.

Of the thirty-two member FDDI standard symbol set, sixteen are data symbols (each representing four bits of ordinary binary data) and eight are control symbols. The eight control symbols include J (the first symbol of a start delimiter byte JK), K (the second symbol of the start delimiter byte JK), I (Idle), H (Halt), Q (Quiet), T (End Delimiter), S (Set) and R (Reset).

The remaining eight symbols of the FDDI standard symbol set are not used because they violate code run length or DC balance requirements of the protocol.

A continuous stream of control symbol patterns defines a line state. The FDDI protocol defines seven line states:

(1) Idle Line State (ILS), which is a continuous stream of Idle symbols;
(2) Quiet Line State (QLS), which is a continuous stream of Halt Symbols;
(3) Halt Line State (HLS), which is a continuous stream of Halt symbols;
(4) Master Line State (MLS), which is a continuous stream of alternating Halt and Quiet symbols;
(5) Reception of a start delimiter symbol pair JK, indicating ALS;
(6) Noise Line State (NLS); and
(7) Line State Unknown (LSU).

FIG. 1 shows the fields which are used within the FDDI frame and token formats. A preamble field (PA), which consists of a sequence of Idle line-state symbols, precedes every transmission. The Idle symbols provide a maximum frequency signal which is used for receive clock synchronization. The Start Delimiter field (SD) consists of a two symbol start delimiter pair which is uniquely recognizable independent of symbol boundaries.

As stated above, the Start Delimiter byte establishes the boundaries for the information that follows. The Frame Control field (FC) defines the type of frame and its characteristics; it distinguishes synchronous from asynchronous transmission, specifies the length of the address and identifies the type of frame. The Frame Control field uniquely distinguishes a token. The Ending Delimiter field (ED) of a token consists of two end delimiter symbols and completes a token.

The Destination Address (DA) and Source Address (SA) fields contain the destination and source addresses of the transmitted frame. The Destination Address field and the Source Address field are both either two bytes long or six bytes long, as determined by the Frame Control field. The Destination Address may be either an individual address or a group address. The Frame Check Sequence field (FCS), which is four bytes long, contains a cyclic redundancy check using the ANSI standard polynomial. The INFORMATION field, as is the case for all fields covered by the Frame Check Sequence check, consists only of data symbols. The End Delimiter of a frame is one end delimiter symbol (T), which is followed by the Frame Status field (FS) which consists of three control indicator symbols which indicate whether the addressed station has recognized its address, whether the frame has been copied, or whether any station has detected an error in the frame. The "T" followed by three control indicators represents the minimum end of frame sequence (EFS) required by the FDDI protocol for a non-token frame. The protocol allows for additional pairs of control symbols in the EFS or an additional odd number of control symbols followed by one last "T" symbol. All conforming implementations must be able to process these extended end delimiters without truncating them. The end delimiter "T" and the two control symbols "R" and "S" are uniquely encoded and distinguishable from either normal data or Idle symbols.

FIG. 2 shows the component entities included in a station that is in compliance with the FDDI protocol. The identified components include a Station Management function (SMT) which is a part of network management that resides in each station on the network to control the overall action of the station to ensure proper operation as a member of the ring. A Physical Layer Medium Dependent (PMD) function provides the fiber-optic links between adjacent stations on the ring. A Physical function (PHY) provides the encoding, decoding, clocking and synchronization functions. A Media Access Control function (MAC) controls access to the transmission medium, transmitting frames to and receiving frames from the MACs of other stations.

The PHY simultaneously receives and transmits information. The PHY's transmit logic accepts symbols from the MAC, converts these symbols to 5-bit code groups and transmits the encoded serial stream on the medium. The PHY's receive logic receives the encoded serial stream from the medium, establishes symbol boundaries based on the recognition of a start delimiter symbol pair and forwards decoded symbols to its associated MAC.

Additional information regarding the FDDI protocol is presented by Floyd E. Ross, "FDDI—an Overview", Digest of Papers, Computer Soc. Intl. Conf., Compcon '87, pp. 434-444, which is hereby incorporated by reference to provide additional background information relating to the present invention.

To reduce jitter accumulation in any signal transmitted on a ring network, as stated above, each station on the FDDI ring must transmit with its own local clock ("jitter" is defined as the short term variation of the transition edges of the digital signal from their ideal positions). According to the FDDI protocol, this local clock is allowed to have a maximum frequency variation of only ±50 PPM from the transmit clock frequency of other stations in the network at a transmission rate of 125 Mbits/sec. Because the transmitted data are encoded according to a 4B/5B scheme, that is, 4 bits of data are encoded to create a 5-bit symbol, the 125 Mbit/sec. FDDI transmission rate translates to a 100 Mbit/sec. data rate.

To accommodate the maximum allowable ±50 PPM frequency variation between stations on an FDDI network, the FDDI protocol requires that an elasticity buffer providing at least plus/minus 4.5 bits of elasticity be incorporated in each station. The recovered receive clock writes data into the elasticity buffer and the local transmit clock reads the data from the elasticity buffer in the same order as written for retransmission on the ring.

The design of a conventional elasticity buffer is relatively straightforward. Basically, an elasticity buffer is a cyclic buffer queue, that is, a series of sequentially accessed storage registers wherein access for a particular operation, i.e. write or read, returns or "wraps around" to the first register in the series after the last register in the series has been accessed for that operation. Write pointer logic, typically an incrementing counter, holds the address of the storage register currently accessed for a write operation. Similarly, read pointer logic holds the address of the storage register currently being accessed for a read operation.

The elasticity buffer's write pointer starts writing receive symbols into the storage registers of the elasticity buffer upon identifying a start delimiter and stops writing symbols after an end delimiter has been written. Similarly, the elasticity buffer's read pointer starts reading symbols from the storage registers upon receiving a read-start signal and stops reading symbols after reading an end delimiter.

A major limitation of the conventional cyclic queue elasticity buffer design is its requirement that a time gap of at least one control symbol character or more of a certain pattern exist between sequential data frames. That is, since the conventional elasticity buffer depends on the appearance of at least one Idle symbol pair to function correctly, a conventional elasticity buffer cannot handle back-to-back information frames with no separation. Also, since there is no predetermined start area for the second and subsequent back-to-back data frames, both the write and the read pointer logic must "remember" their previous positions. In addition, a conventional elasticity buffer cannot function with a continuous stream of line state characters which contains neither a start delimiter nor an end delimiter. Furthermore, a conventional elasticity buffer is not readily testable due to its indeterministic addressing scheme, i.e., a start delimiter symbol pair JK can be written anywhere in the cyclic buffer and therefore, cannot be readily anticipated in a particular storage register.

An elasticity buffer architecture which addresses the limitations of a conventional elasticity buffer design is disclosed in co-pending and commonly assigned U.S. patent application Ser. No. 338,587, which was filed on Apr. 14, 1989 by Gabriel Li and James R. Hamstra (co-inventor of the subject invention) for SYMBOL-WIDE ELASTICITY BUFFER; the co-pending Li et al application is hereby incorporated by reference to provide additional background information regarding the present invention.

The basic storage core of the elasticity buffer disclosed by Li et al is divided into two distinct sections, a START section and a CONTINUATION section. The elasticity buffer's write pointer will not enter the CONTINUATION section, which constitutes a conventional cyclic queue, until the read pointer is directed to the first of the multiple, sequential registers included in the START section. The read pointer must then sequentially read each of the START section registers before entering the CONTINUATION section. Once the write pointer or the read pointer has left the START section, it can only re-enter upon receipt of a start delimiter signal. When the write pointer or read pointer reaches the last register in the multiple register CONTINUATION section, it is automatically routed back to the first register in the CONTINUATION section, unless the R-Flag is set. In this case, the elasticity buffer "stalls", that is, it repeatedly reads the last register in the CONTINUATION section until a "start" or "continue" signal is received.

Thus, the Li et al design provides a number of advantages over conventional elasticity buffers. First, the length of the START section determines the maximum separation of the read pointer and the write pointer. Second, to handle back-to-back information frames without separation, one more buffer is added to the START section and the write pointer issues a start signal to the read pointer one symbol time after writing this register. Third, since the write pointer doesn't need to know the position of the read pointer when starting a new frame, the write pointer control logic is greatly simplified.

While the Li et al elasticity buffer described above provides advantages over conventional elasticity buffer designs, it cannot handle some practical applications. For example, it does not prevent token trashing or accommodate any short back-to-back frames. It requires a long write pointer chain and a long read pointer chain with extra logic to reset the counters against possible alpha particle hit. Since both the write pointer and the read pointer may stop, extra stopping logic is required. Nor does it provide overflow/underflow detection.

SUMMARY OF THE INVENTION

An elasticity buffer in accordance with the present invention includes a memory core, write pointer and read pointer logic and associated control logic and an error detection scheme. The memory core includes a sequentially-arranged multi-character START area and a sequentially-arranged multi-character CONTINUATION area. During normal operation, the read pointer follows the write pointer cyclically within the CONTINUATION area. Upon detection of a start delimiter or on every fourth byte of repeatable line state in general, the elasticity buffer recenters. In the case of detection of a start delimiter, the write pointer writes a "stuff byte" into the CONTINUATION area storage element it is currently addressing and then points to the second sequential storage element in the START area, the first storage element in the START area comprising a hard-wired pattern corresponding to the start delimiter; then when the read pointer receives a read-start signal, it leaves its current address to read from the first storage element in the START area, i.e. the hard-wired start delimiter. That is, there are two operating modes in which the elasticity buffer can recenter. In the FRAME mode, recentering occurs on reception of a start delimiter. In the CONTINUE mode, recentering can occur at a fixed rate in most line states.

Flip-flop chain SYNCHROS are used to reduce metastability problems caused by asynchronous sampling of received data. Separate SYNCHRO chains are provided for the FRAME mode and the CONTINUE mode. Separate FRAME mode and CONTINUE mode synchronization paths, together with the byte-wide implementation, lopsided overflow and underflow guardbands, and the clocking of the storage element address advancement, all work together to reduce drastically the node delay introduced by the station's receiver while providing more than enough room to absorb clock skews, thereby allowing less expensive clocks to be used when necessary.

The simple 2-bit Johnson counters that serve as the core of both the write pointer logic and the read pointer logic are self-correcting. Therefore, there is no need for resetting logic to correct for alpha particle hits or other random pointer logic errors.

A delay-by-one mechanism is built into the FRAME mode SYNCHRO so that an early sample of the read-start signal by the local clock while the read pointer is well behind the write pointer will not drop the last character of the previous frame when that frame is not separated from the next start delimiter by a sufficient interframe gap. The delay-by-one mechanism also supports synchronized cascading of parallel receivers for increased throughput or fault tolerance. The delay-by-one mechanism relies on a look-ahead-look-current detector to override the delay-by-one mechanism if a repeatable character is to be read within the current or next subsequent clock cycles after assertion of the read-start signal. Thus, with the help of the look-ahead-look-current detector, the delay-by-one-mechanism will not delay on top of late sampling of the read-start signal, which would cause too much initial separation between the write pointer and the read pointer.

A delay-GO mechanism is built into the CONTINUE mode SYNCHRO chain to prevent irregular dropping of line state characters when the local byte clock is trapped within the metastability window of the SYNCHRO flip-flops while clock drift is infinitesimal. However, as in the case of delay-by-one mechanism for the FRAME mode SYNCHRO, the delay-GO mechanism references the read pointer address to prevent recentering unnecessarily, thereby creating too much initial separation between the write pointer and the read pointer.

Other objects and advantages of the present invention will become apparent by reference to the detailed description of the invention provided below, which should be considered in conjunction with the accompanying drawing.

DETAILED DESCRIPTION OF THE INVENTION

Figure 1:
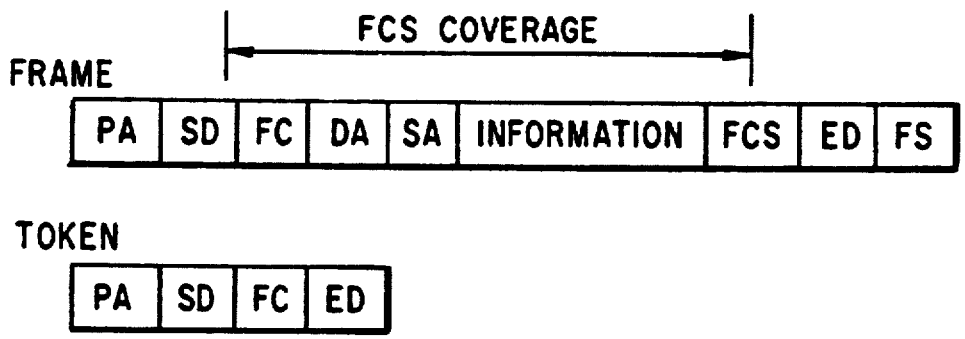
FIG. 1 illustrates the FDDI frame and token formats.
Figure 2:
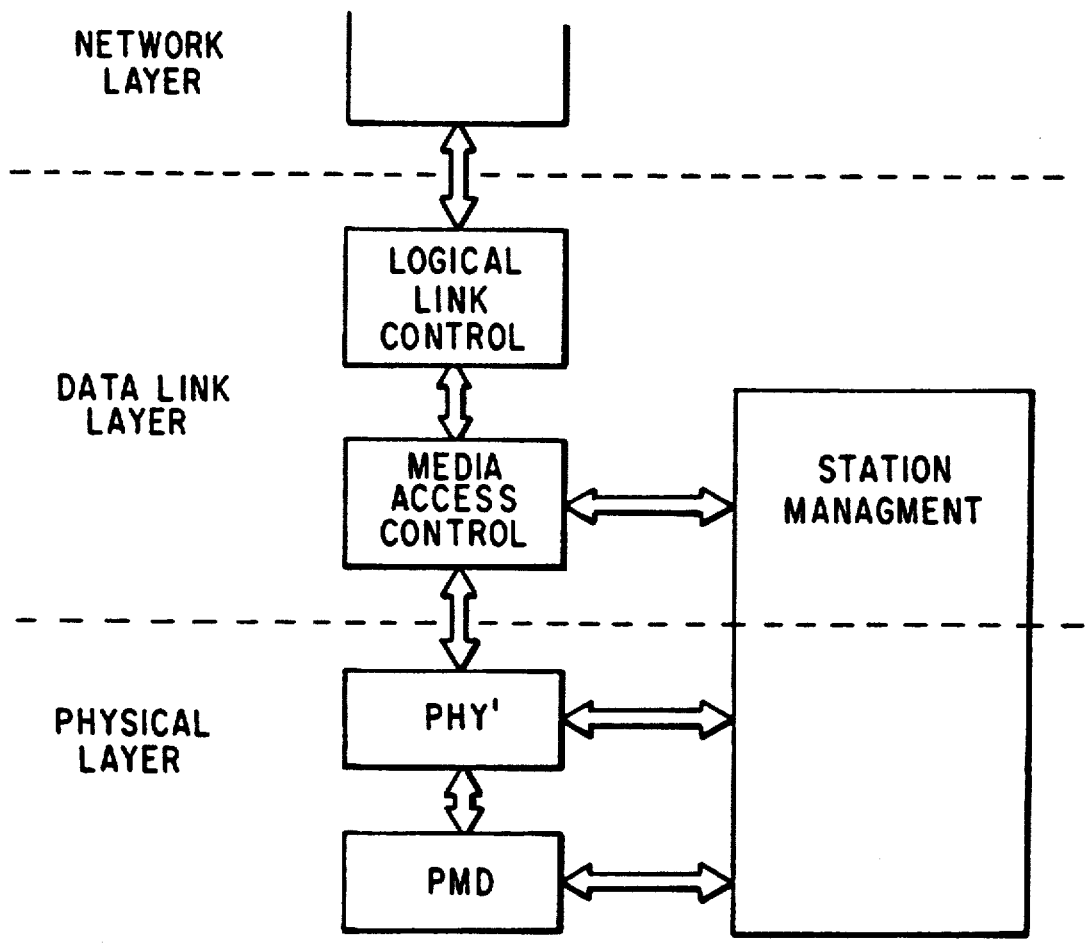
FIG. 2 is a block diagram illustrating the components required for a station in compliance with the FDDI protocol.
Figure 3:
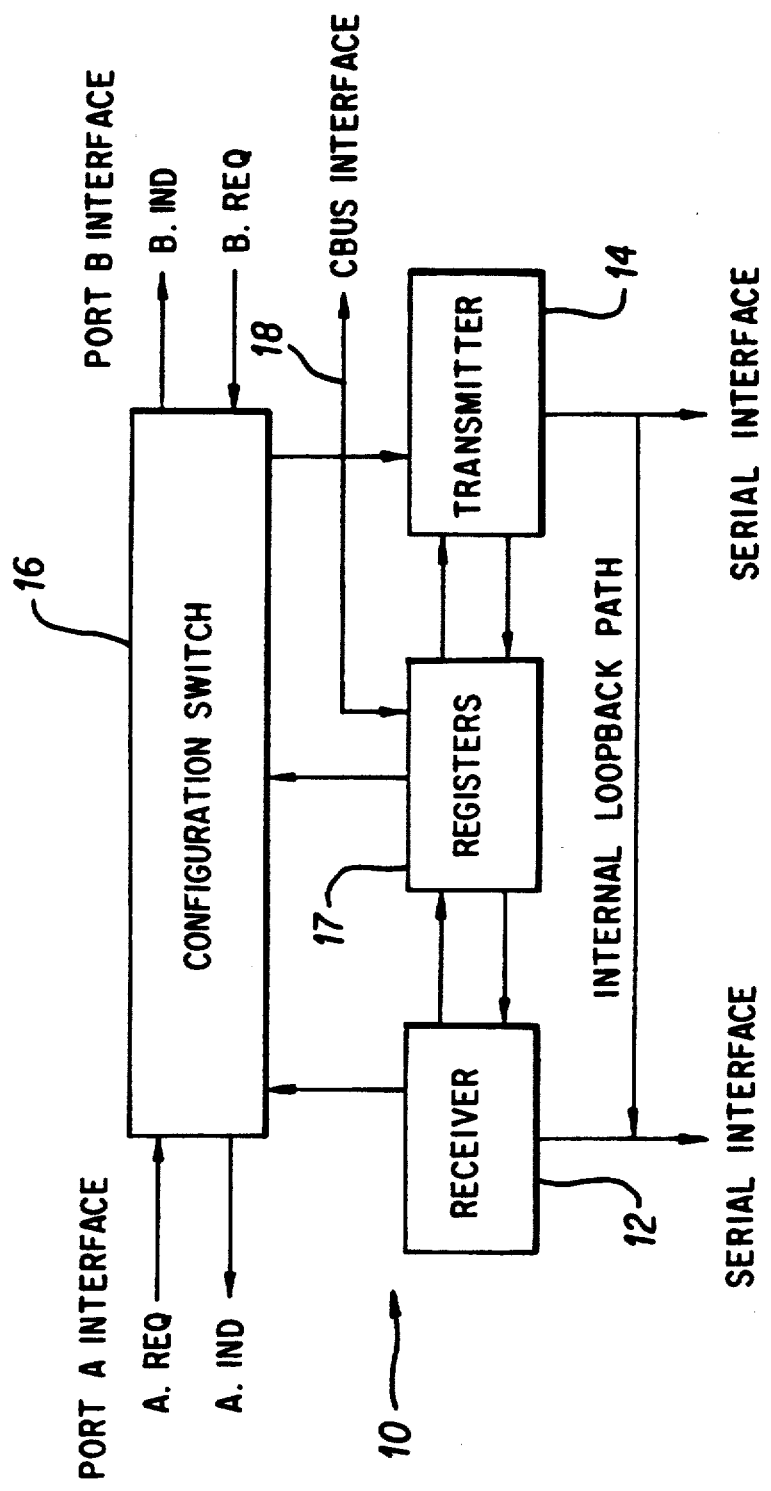
FIG. 3 is a block diagram illustrating the basic components of an FDDI PHY function.

FIG. 3 shows a block diagram of a Physical Layer Controller (Player) 10 which implements the PHY function as defined by the Fiber Distributed Data Interface (FDDI) protocol. The Player 10 includes four primary blocks: a receiver 12, a transmitter 14, a configuration switch 16 and a control bus interface 18. The Player 10 also incorporates a number of storage registers 17 which retain data which define the operating characteristics of the Player 10.

The receiver 12 accepts serial binary information either from the serial interface with the fiber optic transmission medium of an associated FDDI network or from the transmitter 14 via an internal loopback path. The receiver 12 converts the information stream from the Non-Return-To-Zero-Invert-On-Ones (NRZI) format utilized on the FDDI medium to the Non-Return-To-Zero (NRZ) format used internally by the receiving station and decodes the NRZ data from external 5B coding to internal 4B coding. The receiver 12 establishes the 10-bit FDDI symbol pair (byte-wide) boundaries for the serial bit stream and synchronizes the upstream station's clock to the receiving station's local clock. The receiver 12 also performs line state detection, link error detection and presents the FDDI data received from the transmission medium to the configuration switch 16 as internally coded symbol pairs.

The transmitter 14 accepts internally coded symbol pairs from the configuration switch 16 and encodes the symbol pairs from the internal 4B coding to the external 5B coding. The transmitter 14 also filters out code violations in the information stream and redistributes Idle bytes which are added or deleted by the Player's elasticity buffer, which is described in greater detail below. In addition, the transmitter 14 is capable of generating Idle, Master, Halt and Quiet line state symbols and other user-defined symbol pairs. The transmitter 14 also converts the stream from NRZ to NRZI and presents it to either the receiver 12 via the internal loopback path or to the FDDI fiber optic transmitter as a serial bit stream.

The primary function of the configuration switch 16 is to configure the information flow to support multiple station configurations for different station types without external logic. Additional information regarding the configuration switch 16 may be obtained by reference to commonly-assigned U.S. patent application Ser. No. 444,189 filed Dec. 1, 1989, now abandoned, of even date herewith, titled CONFIGURATION SWITCH, which application is hereby incorporated by reference.

The control bus interface 18 allows the user to program the configuration switch 16, to enable and disable functions within the receiver 12 and the transmitter 14, to report line states and link errors detected by the receiver 12 and to report error conditions.

Figure 4:
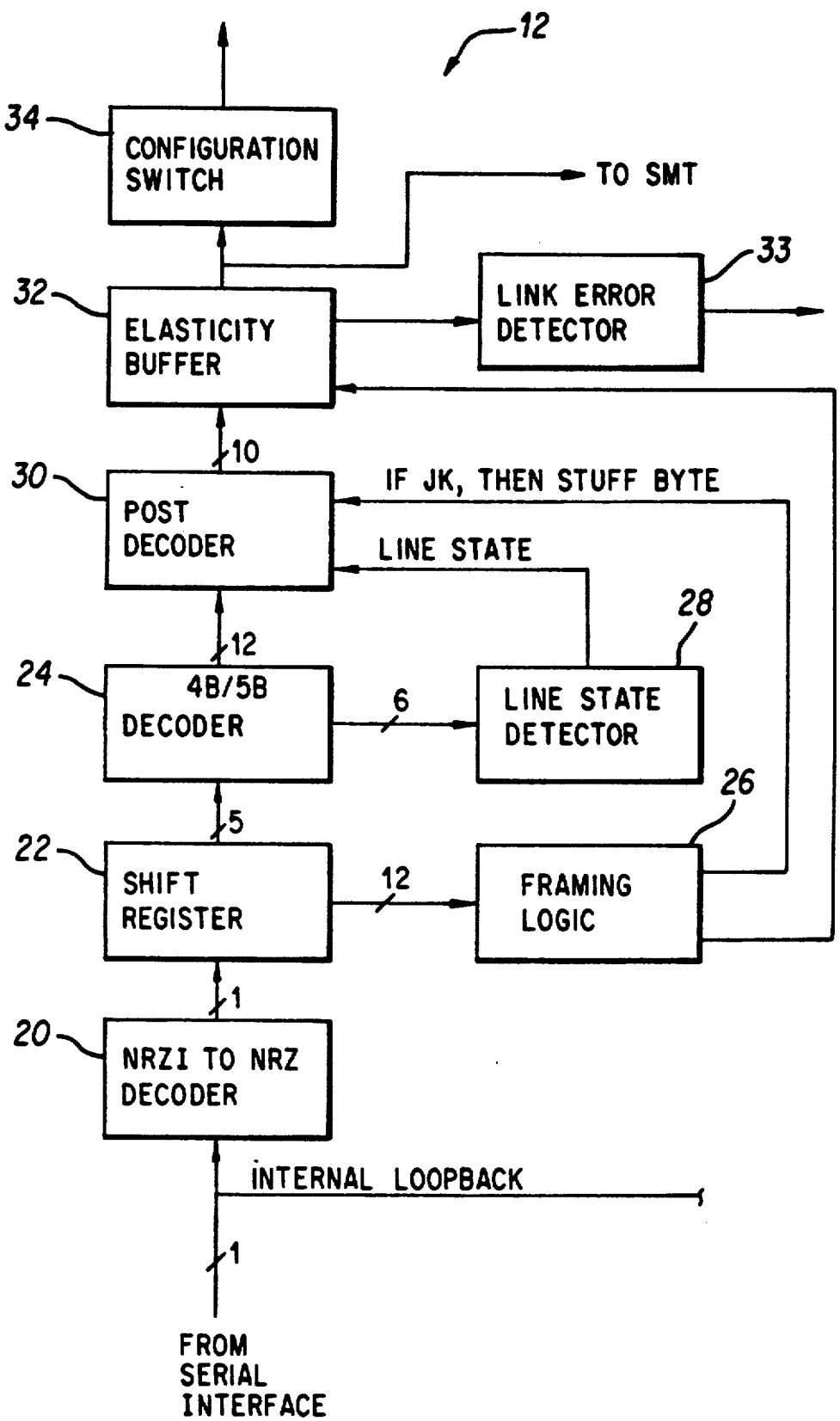
FIG. 4 is a block diagram illustrating the components of an FDDI PHY receiver.

Referring to FIG. 4, the receiver 12 consists of an NRZI to NRZ decoder 20 which converts NRZI data received from either the serial interface or from the transmitter internal loopback path to NRZ data.

The NRZ data is provided to a serial-in, parallel-out shift register 22 which deserializes the NRZ data bit stream into both symbol-wide (5-bit) and byte-wide parallel data. The symbol-wide parallel data is provided to a 4B/5B decoder 24, while the byte-wide parallel data is provided to framing logic 26. The shift register 22 maintains an additional 2 bits of the previous byte to provide more reliable framing information to the framing logic 26.

The framing logic 26 determines the byte boundaries of the incoming serial bit stream. It detects a Halt-Halt symbol pair (00 00100 00100), Halt-Quiet symbol pair (00 0100 00000), with two bits of look-behind, or a JK pattern (11000 10001), on a bit-time basis. As discussed in greater detail below, detection of a JK symbol pair allows for reframing during data reception, while detection of Halt-Halt and Halt-Quiet symbol pairs allows for reframing during line state reception.

The 4B/5B decoder 24 latches the received 5-bit symbols. The symbols are then decoded into 4-bit data symbols with an additional fifth bit indicating whether it is a data symbol or a control symbol plus an additional parity bit over these five bits. Once decoded, the data is converted in byte-wide format (i.e. two 4-bit symbols plus a control bit and a parity bit for each symbol). The decoder 24 also decodes particular byte patterns and issues a corresponding flag for use by the line state detector 28.

The line state detector 28 receives flags from the 4B/5B decoder 24 in order to detect the minimum number of sequential line state symbols required to enter a particular line state. There are eight line states supported by the line state detector 28; these are a superset of the seven line states defined in the FDDI physical standard. Table I below provides a summary of the supported line states:

TABLE I

| | |
|---|---|
| Active Line State (ALS) | Upon reception of a JK symbol pair |
| Idle Line State (ILS) | One Idle symbol pair |
| Super Idle Line State (SILS) | Eight consecutive Idle symbol pairs |
| No Signal Detect (NSD) | Upon the deassertion of TTLSD |
| Master Line State (MLS) | Eight consecutive Halt-Quiet symbol pairs |
| Halt Line State (HLS) | Eight consecutive Halt-Halt symbol pairs |
| Quiet Line State (QLS) | Eight consecutive Quiet-Quiet symbol pairs |
| Noise Line State (NSL) | Sixteen nose events |
| Line State Unknown LSU) | Upon reception of an inconsistent byte with respect to the current line state |

The byte-wide data from the 4B/5B decoder 24 is provided to a post decoder 30, which also receives inputs from the line state detector 28 and the framing logic 26.

The post decoder 30 responds to the 12-bit code pattern (which comprises two 4B symbols, each including a control bit and a parity bit) provided by the 4B/5B decoder 24, the output of the framing logic 26, and the output of the line state detector 28 by generating a 10-bit internal code point symbol pair or byte.

If the receiver 12 is in Active Line State (ALS), then the post decoder 30 simply provides a replica of its input to the elasticity buffer 32. However, when the line state detector 28 informs the post decoder 30 that a non-ALS line state has been detected, then the post decoder 30 generates a symbol pair comprising an I' or V' symbol, depending on the line state condition, followed by a symbol that identifies the current line state. In addition, when the framing logic 26 indicates to the post decoder 30 that a JK symbol pair has been detected, the post decoder 30 generates an I' or V' symbol pair, depending on the situation, as a stuff byte to the elasticity buffer 32. That is, a JK symbol pair is never actually written into the elasticity buffer 32; a JK symbol pair is, however, read from the elasticity buffer 32, as will be described in greater detail below.

Thus, the post decoder 30 helps filter out corruptions in the Idle Line State (ILS) and inserts a stuff byte when necessary to compensate for timing differences in the elasticity buffer 32. The post decoder 30 also incorporates line state information in the symbol pairs entering and leaving the elasticity buffer 32 to provide line state information to the Station Management (SMT) function via a separate tap from the read pointer of elasticity buffer 32 to eliminate a separate synchronized pattern for line state reporting. The post decoder 30 also allows J symbols and K symbols to be interpreted differently in different circumstances; for example, J and K are treated as violations when not processed as a pair by the framing logic 26.

Additional information regarding the receiver 12 may be obtained by reference to copending and commonly assigned U.S. patent application Ser. No. 444,561, filed Dec. 1, 1989 of even date herewith, titled CODE POINTS FOR TRANSFERRING DATA FROM A NETWORK TRANSMISSION MEDIUM TO A STATION ON THE NETWORK, now U.S. Pat. No. 5,046,182, which application is hereby incorporated by reference.

An elasticity buffer 32 performs the function of a "variable depth" FIFO to compensate for clock skew between the recovered sampling clock and the local transmit clock.

Figure 5:
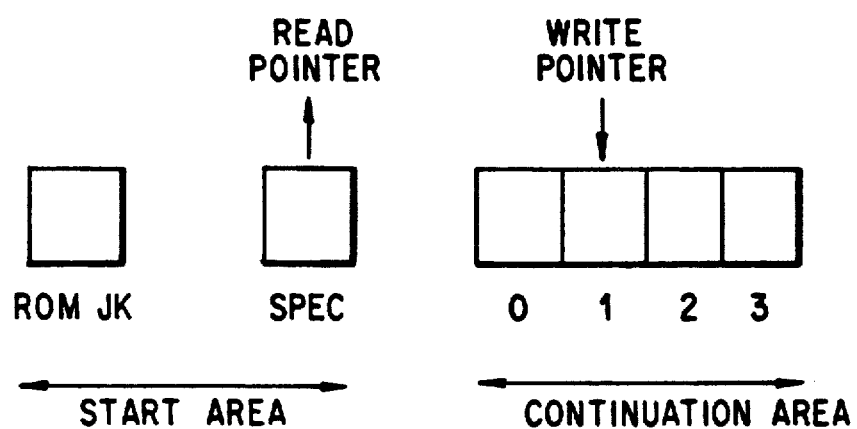
FIG. 5 is a conceptual illustration of an elasticity buffer in accordance with the present invention.
Figure 6A:
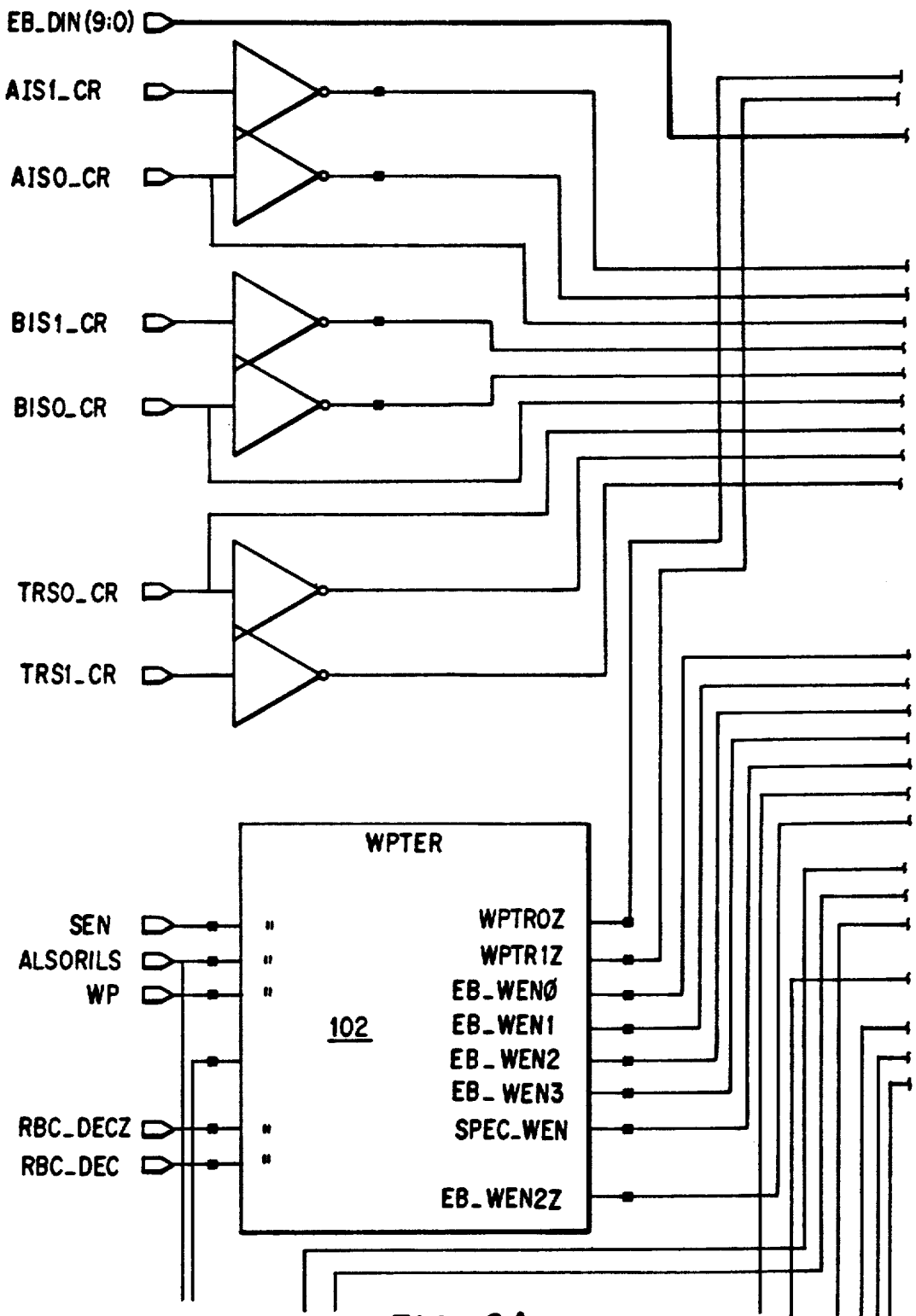
FIG. 6 is a block diagram illustrating an elasticity buffer in accordance with the present invention.
Figure 6B:
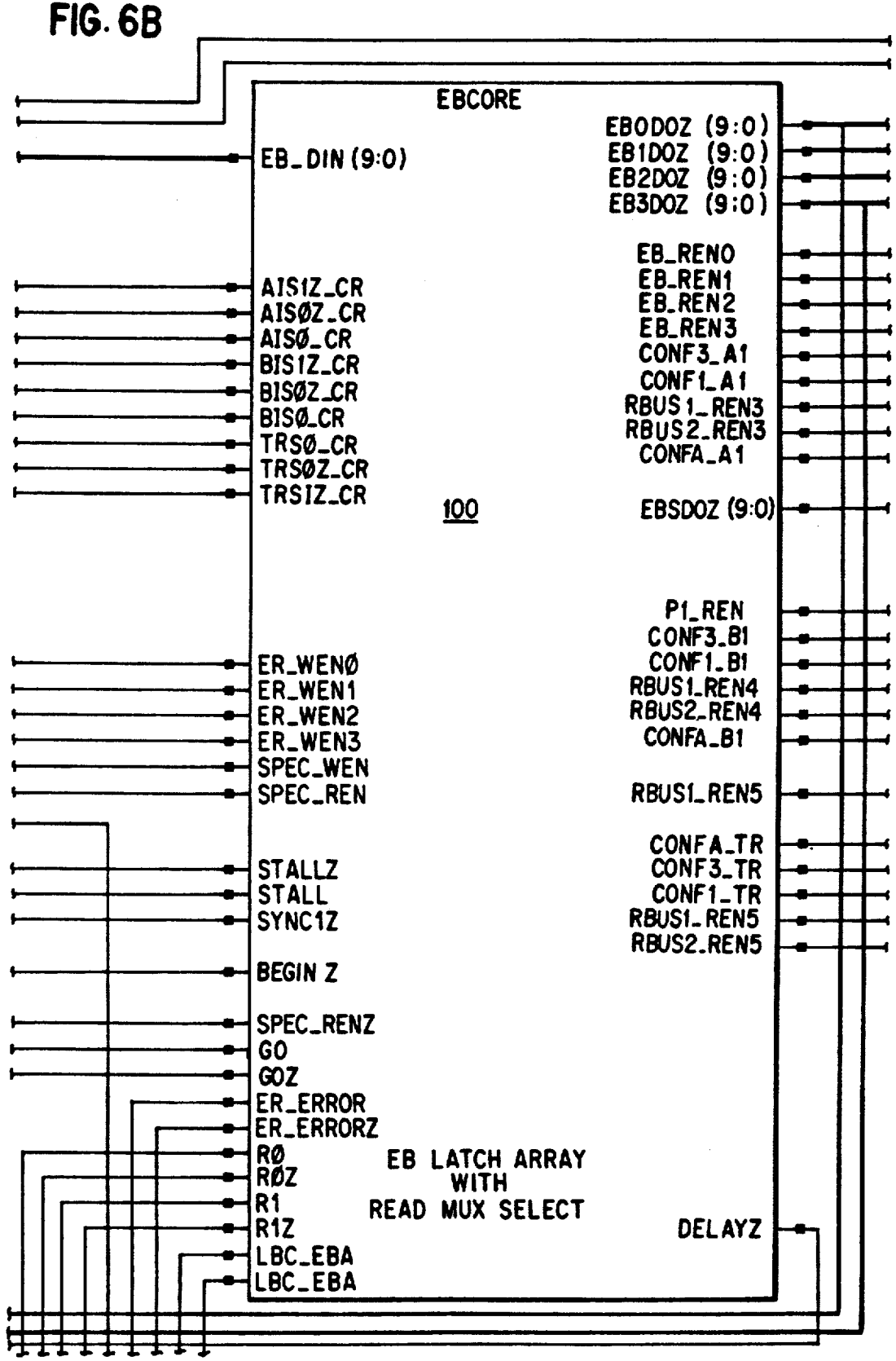
Figure 6C:
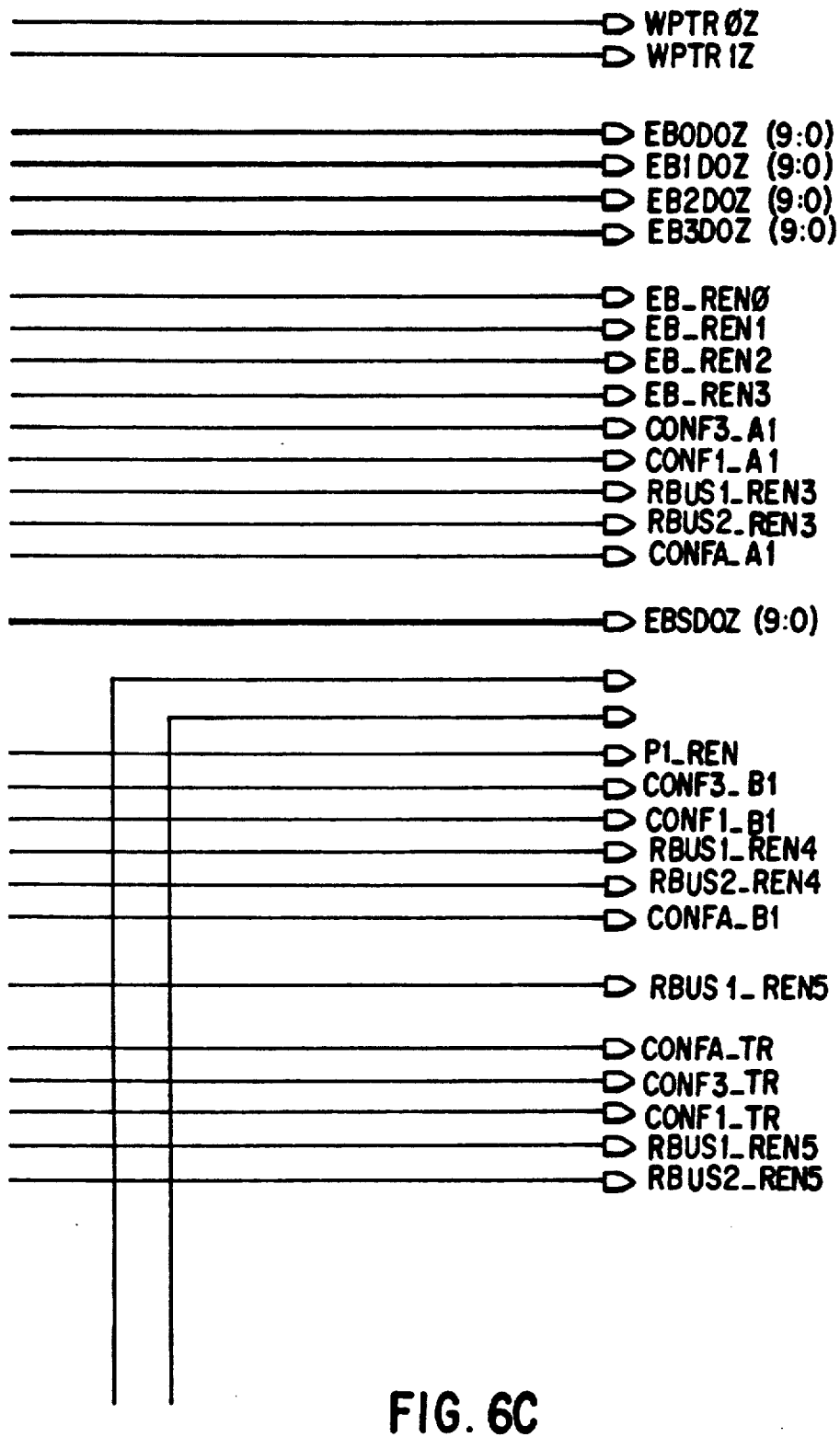
Figure 6D:
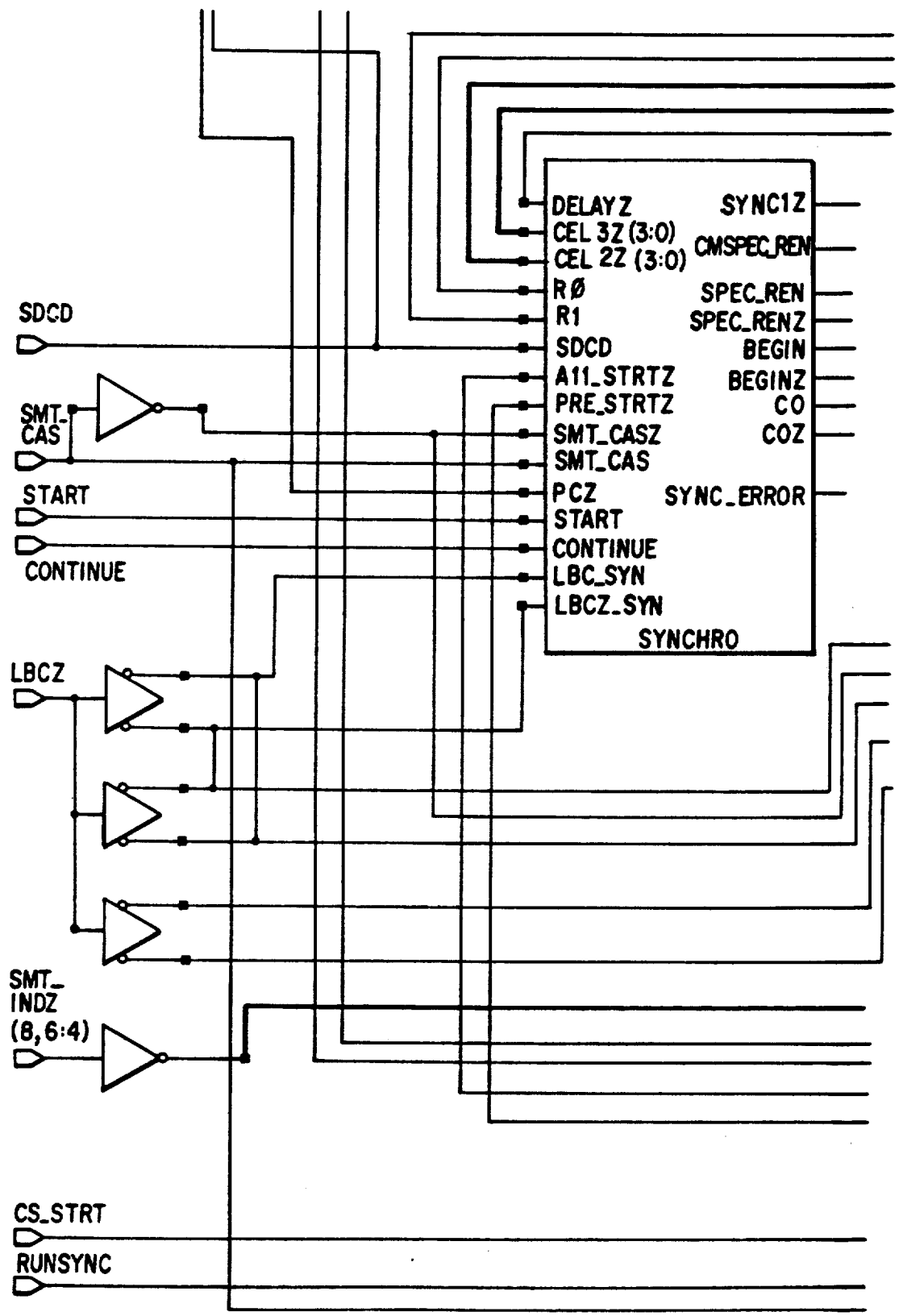
Figure 6E:
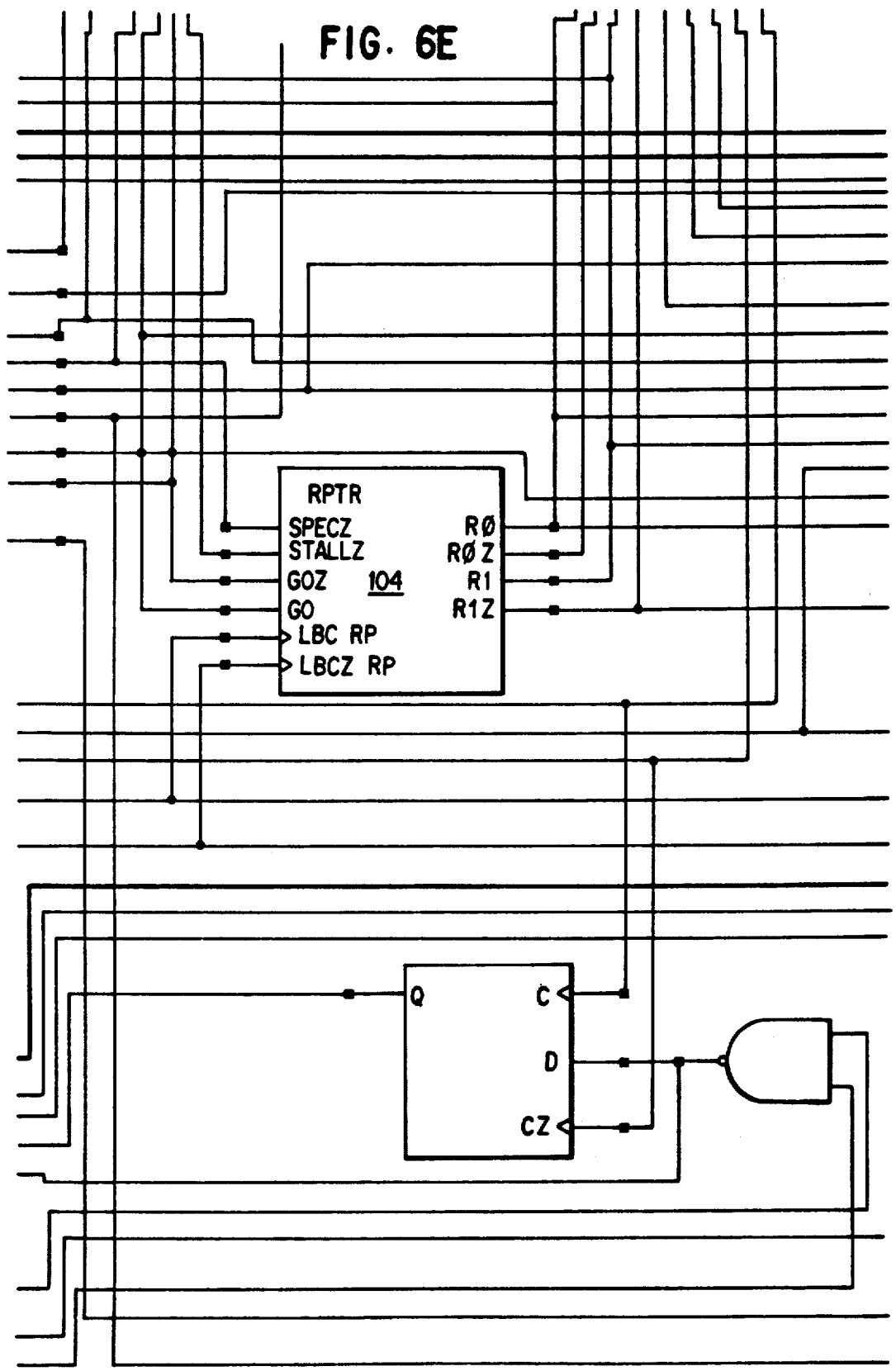
Figure 6F:
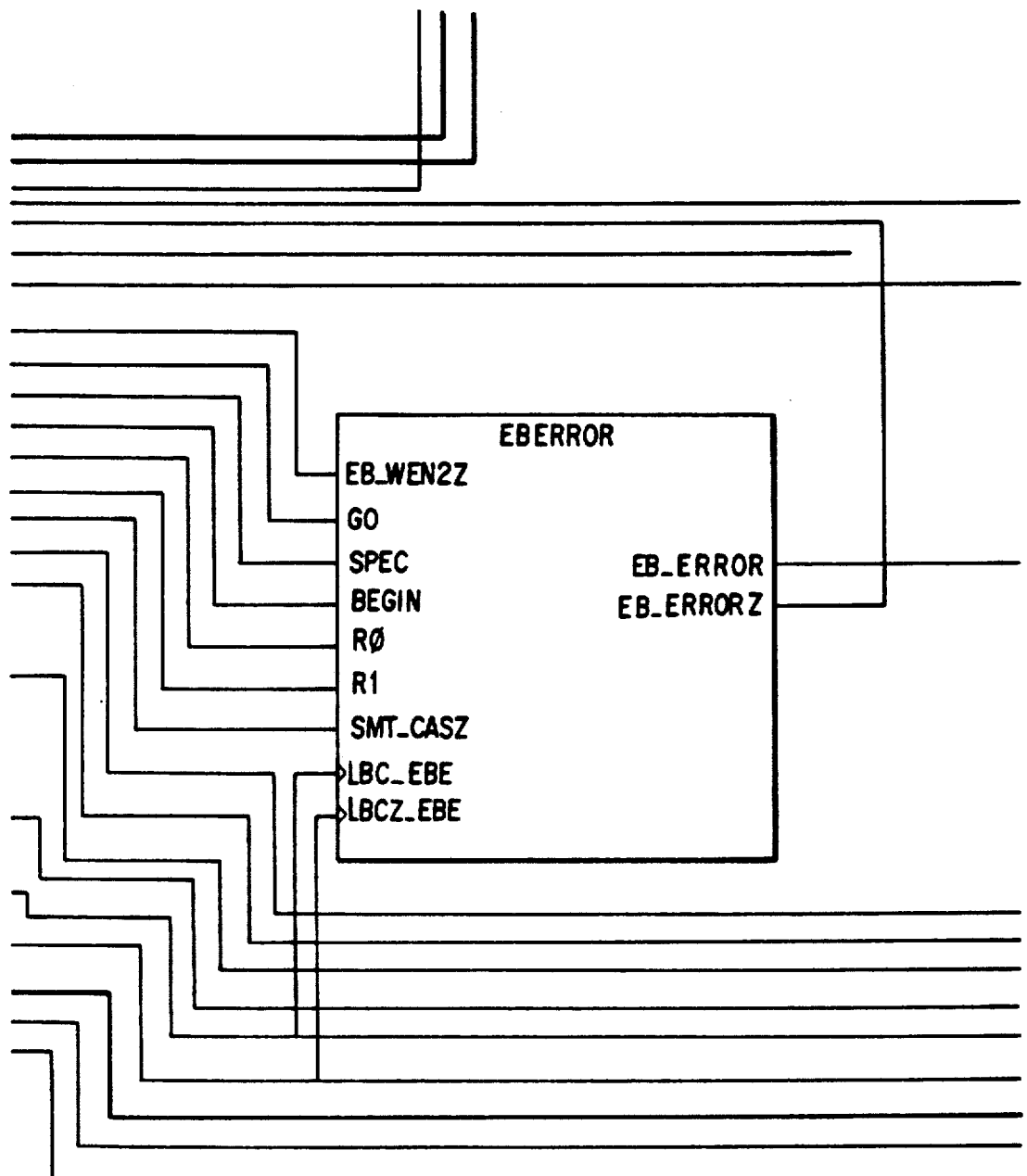
Figure 6G:
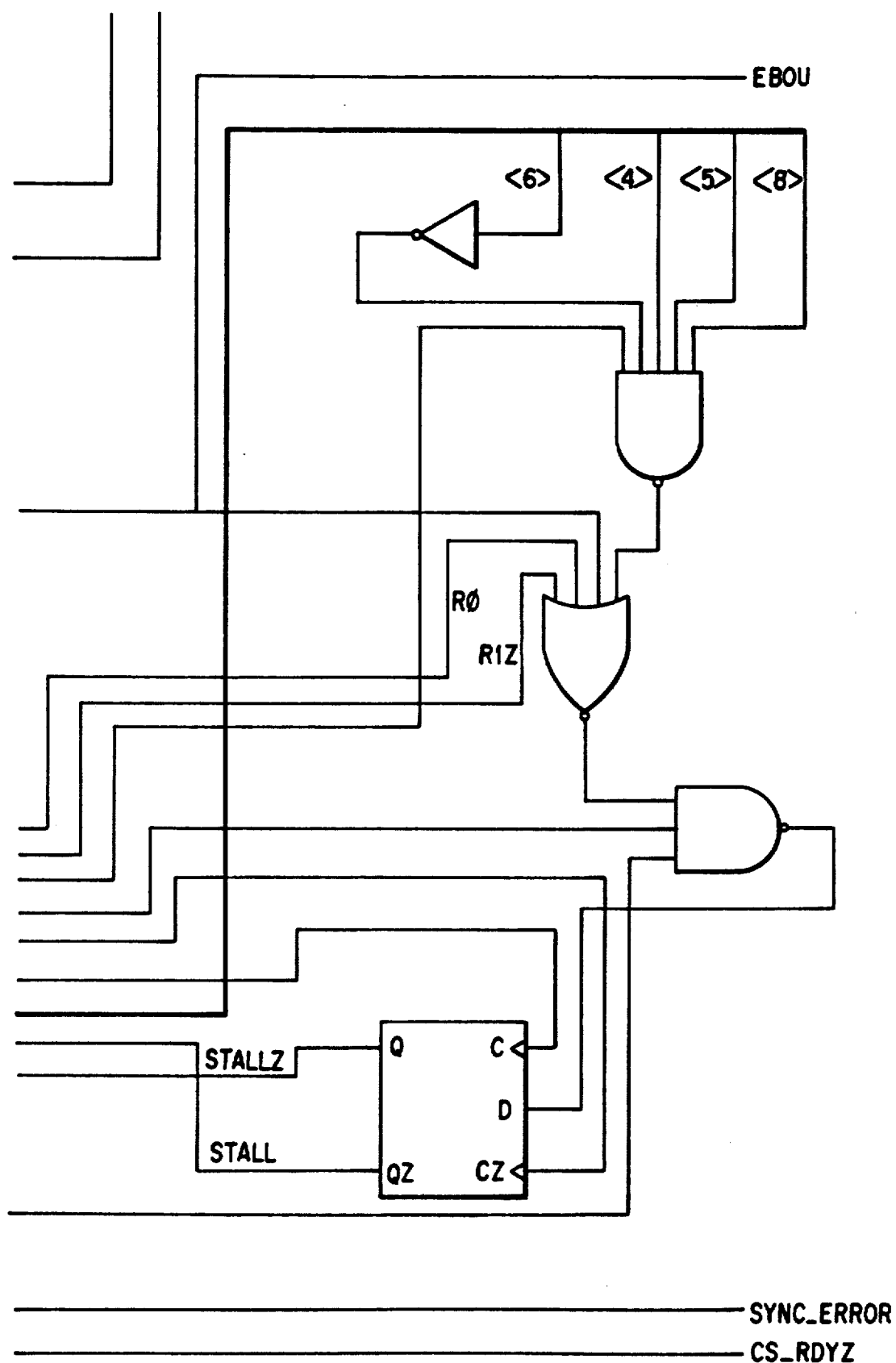
Figure 7A:
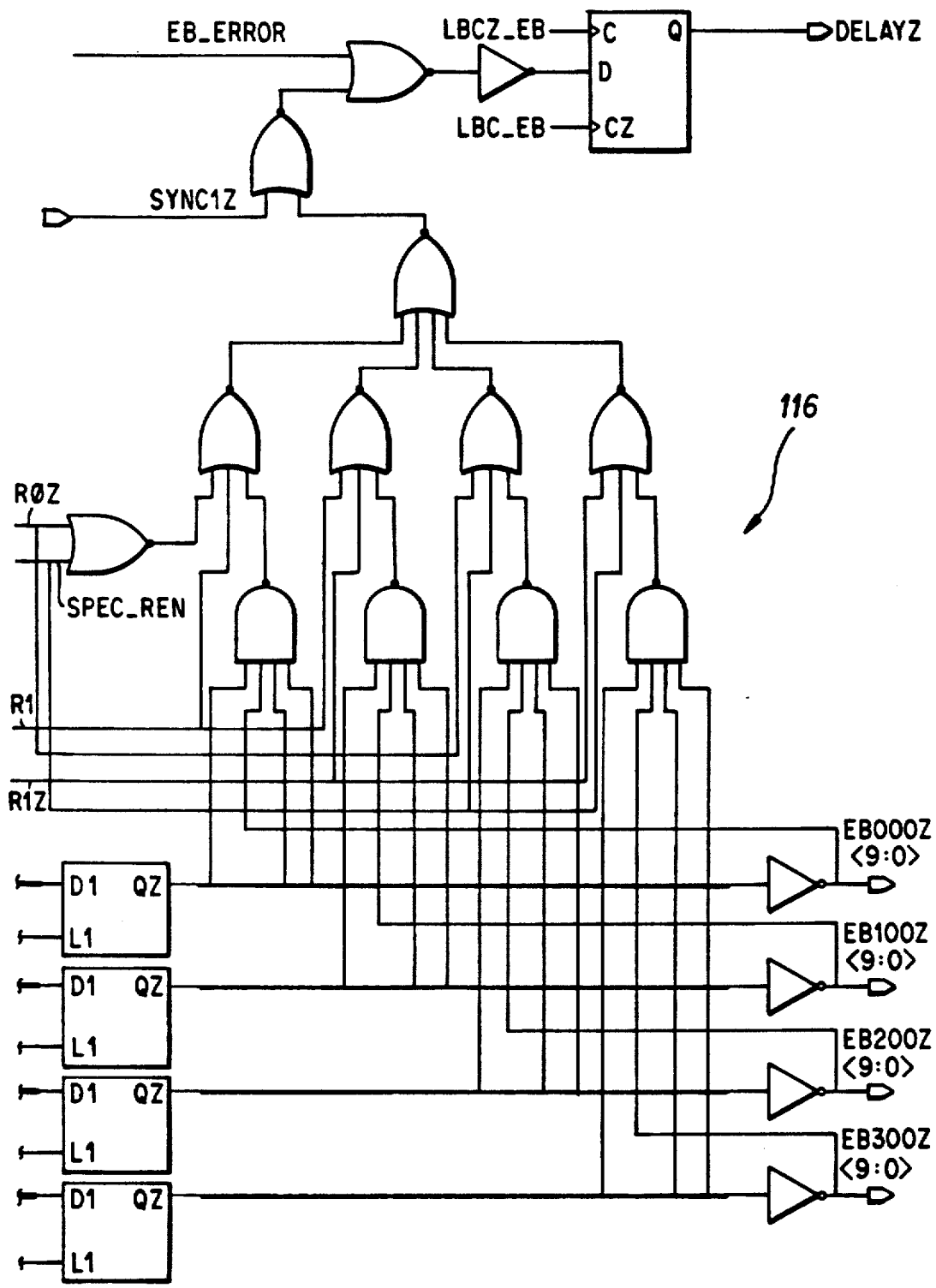
FIG. 7, consisting of FIGS. 7a and 7b, is a logic diagram illustrating the elasticity buffer core read logic.
Figure 7B:
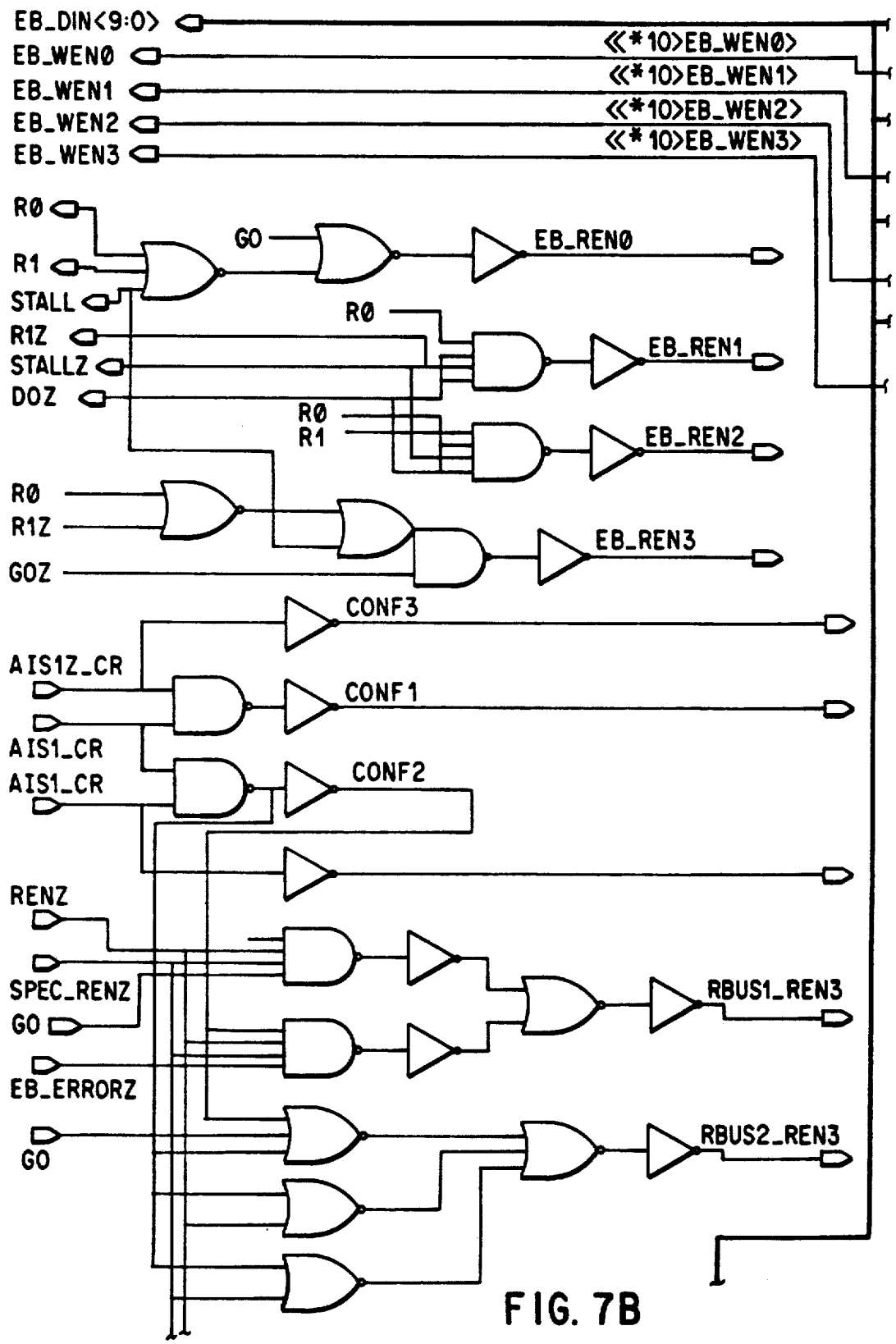
Figure 7C:
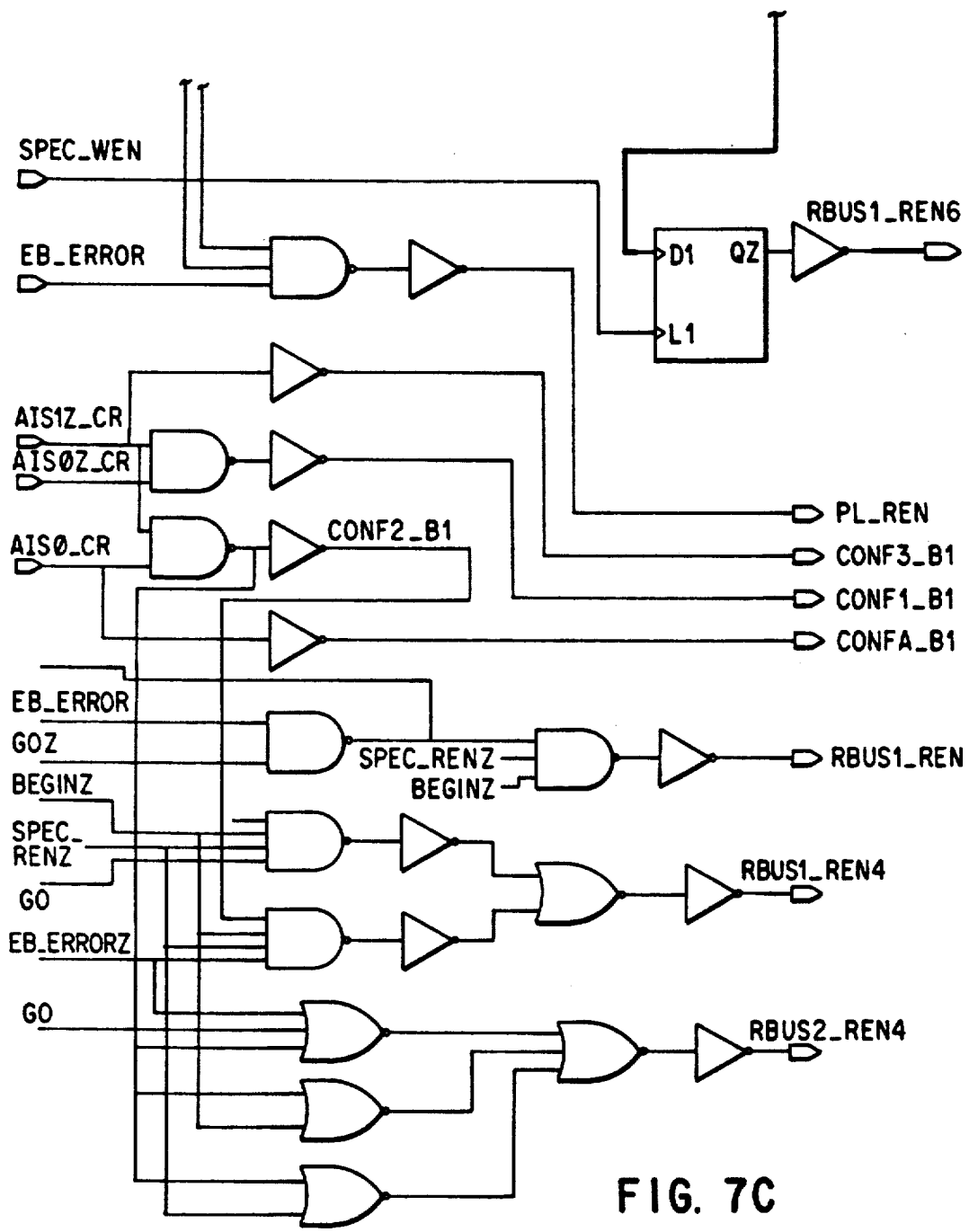
Figure 7D:
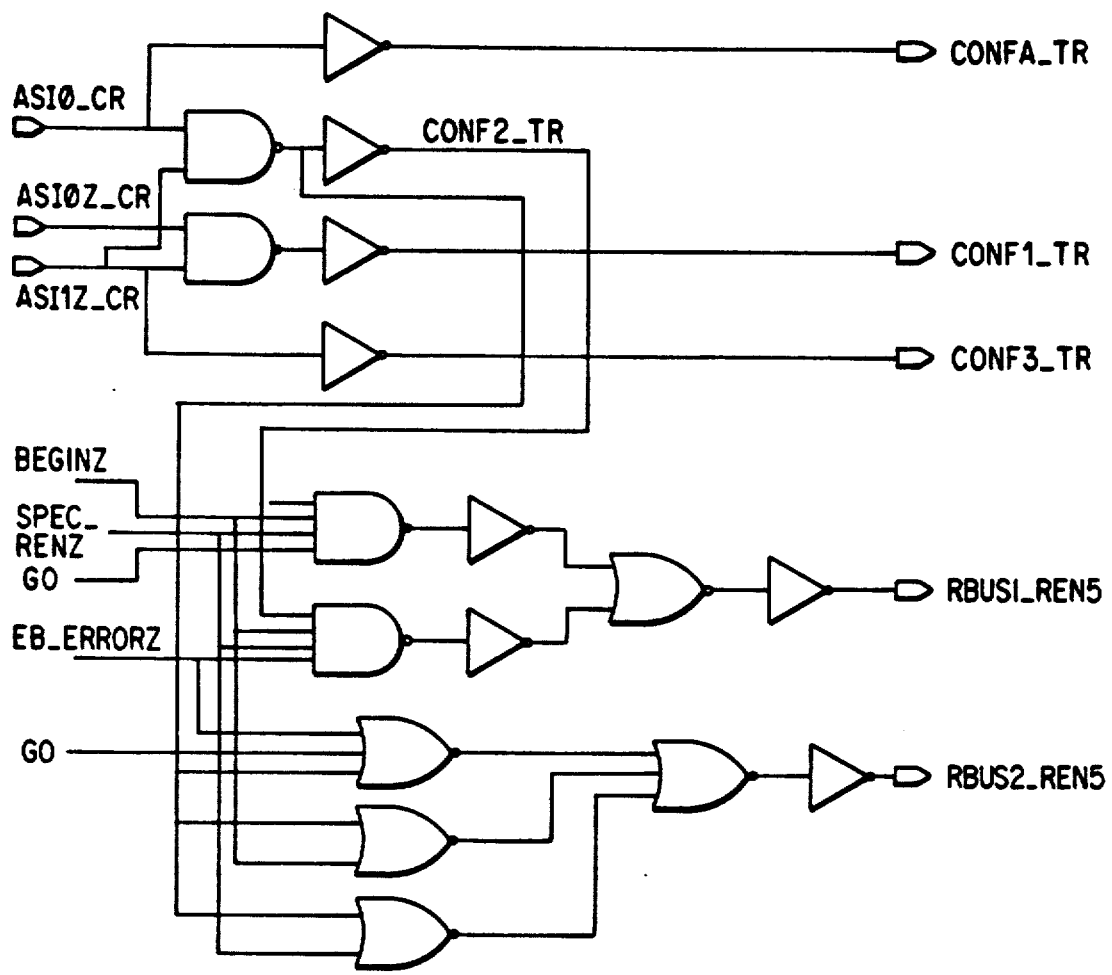

A conceptual representation of a byte-wide elasticity buffer 32 in accordance with the present invention is provided in FIG. 5. Conceptually, the elasticity buffer 34 includes a two byte long START area, a four byte long CONTINUATION area, a read pointer and a write pointer.

The START area addresses are disjointed from the addresses of the CONTINUATION area, which comprises a conventional cyclic buffer queue.

During normal operation, the read pointer follows the write pointer cyclically within the CONTINUATION area. However, upon detection of a start delimiter symbol pair JK, the write pointer writes a "stuff byte", which is provided by the post storage decoder in the current CONTINUATION area storage register location and then points to the second storage cell, i.e. the SPEC cell, of the START area for the next write. The stuff byte is written to fill in the gap when the read pointer is running fast, just in case the read pointer has nothing to read before it receives the read-start signal. When the read pointer receives a read-start signal, it leaves its current address to read from the first "cell" of the START area, which is a hardwired pattern of the start delimiter symbol pair JK, identified as ROM JK in FIG. 5.

The elasticity buffer 32 has two recenter modes (i.e. to set its read and write pointers to a predetermined distance from each other): (1) upon the detection of a start delimiter symbol pair JK, and (2) in general, every four byte times during PHY INVALID and ILS.

The framer 26 only allows a JK to reframe in ALS or ILS.

During Active Line State, reframing is allowed by any alternate off boundary and all on-boundary JK which is detected at least 1.5 byte times after the previous JK. That is, once reframed on a JK, the first subsequent off-boundary JK is ignored, even if it is detected beyond 1.5 byte times after the previous JK. During Active Line State, an Idle or End Delimiter (T) symbol will allow reframing on any subsequent JK, if the JK is detected at least 1.5 byte-times after the previous JK. Once a JK is detected during Active Line State, off-boundary Halt-Halt, or Halt-Quiet symbol pairs are ignored until the end of a continue opportunity.

In the non-ALS mode, after reframing occurs on a Halt-Halt, or Halt-Quiet symbol pair, all off-boundary Halt-Halt or Halt-Quiet symbol pairs are ignored until the end of a continue opportunity, during a line state other than Active Line State. This selective reframing process ensures integrity of the elasticity buffer functions.

An elasticity buffer overflow/underflow bit is set in register block 17 (See FIG. 3) when the elasticity buffer 32 cannot compensate for abnormal clock skews or abnormally long frames.

As further shown in FIG. 4, link error detector 33 provides continuous monitoring of an active link. It detects errors only when in Active Line State or Idle Line State. Link errors will decrement an internal 8-bit link error monitor counter. The start value for the link error monitor counter is programmed to the link error threshold register in the register block 17 (FIG. 3). The link error monitor threshold bit is set to 1 when the link error monitor counter reaches 0. The current value of the link error monitor counter can be read through the current link error count register.

In reality, as shown in FIG. 6, the elasticity buffer 32 includes a First-In-First-Out memory core 100 (which is a 5×10 latch array), write pointer logic 102, read pointer logic 104, a synchronizing logic clock 106 (with adjustments to assist in avoiding blind synchronization that will cause data to be dropped), a look-ahead-look-current detector and a stall mechanism. A multiplexed elasticity buffer output bus RBUS receives byte-wide data from two sources, the START area and the CONTINUATION area of the memory core 100 as described in greater detail below.

As shown in FIG. 7, the core 100 of the elasticity buffer 32 is a latch bank which is physically made up of two hardwired byte patterns and five readable-writable byte-wide latches. One hardwired pattern, PHY INVALID, contains the PI_EBR pattern which, as described in greater detail below, is selected out of the elasticity buffer 32 when an elasticity buffer overflow/underflow error is detected. The other hardwired pattern is ROM JK, the first of the two conceptual bytes comprising the START area of the elasticity buffer 32; the second conceptual byte is Special RAM, or SPEC. The ROM JK and SPEC cells have logically serial addresses. The next four byte-wide latches, which comprise the CONTINUATION section of the elasticity buffer 32 (cells 0,1,2,3), are connected as a cyclic buffer.

Figure 8:
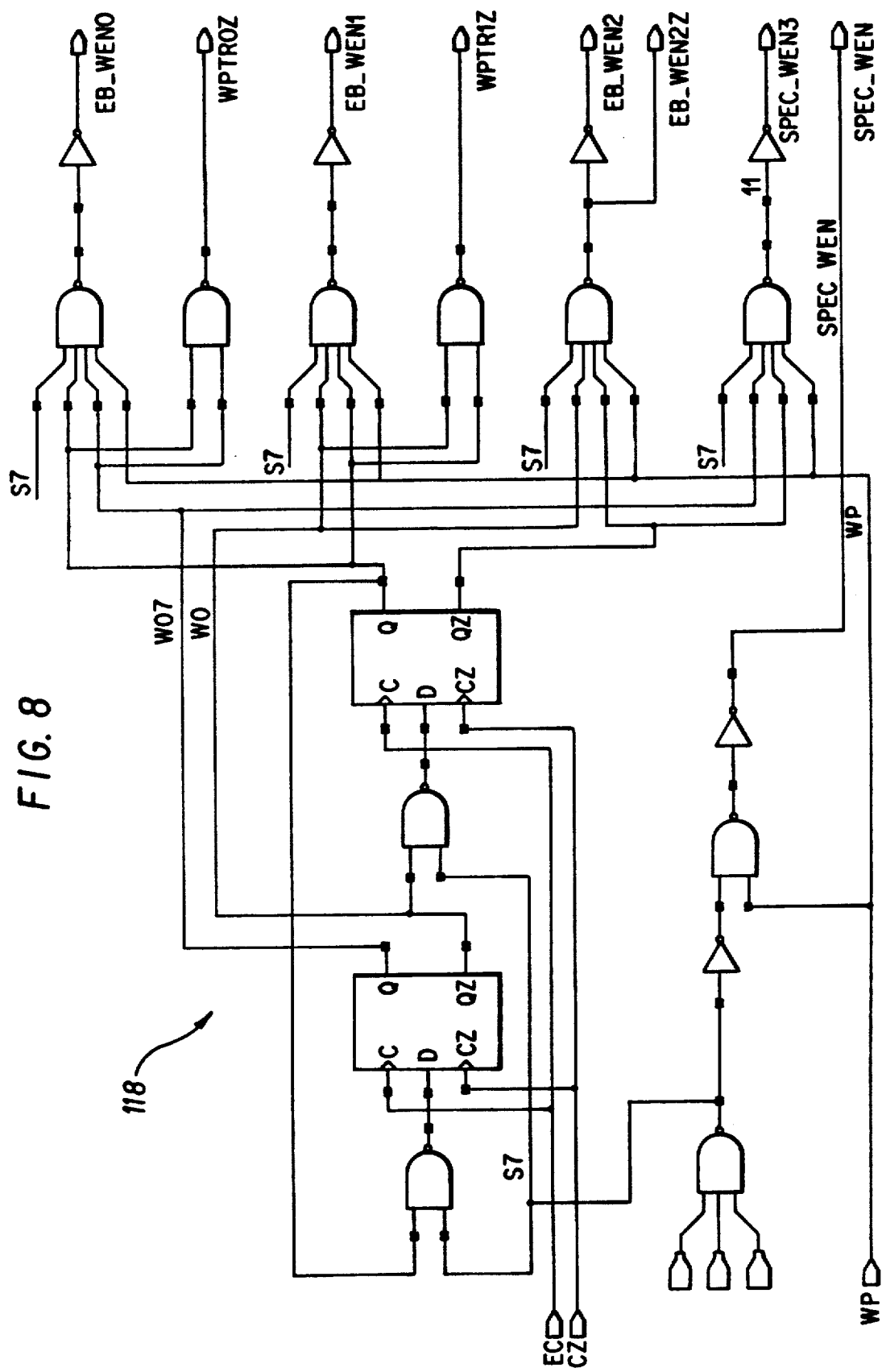
FIG. 8 is a logic diagram illustrating the write pointer counting logic.

A logic diagram for write pointer 102 is shown in FIG. 8.

Figure 9:
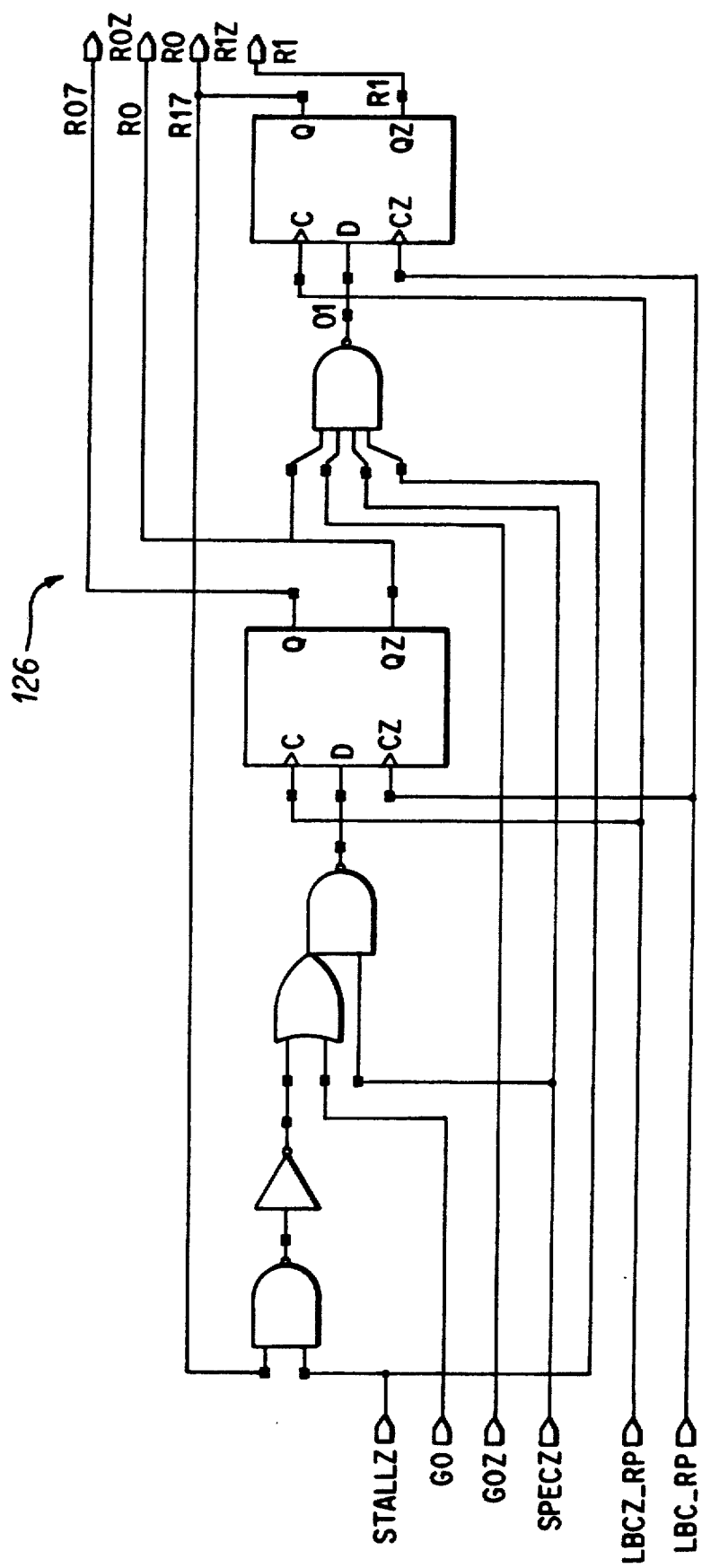
FIG. 9 is a logic diagram illustrating the read pointer counting logic.

The read pointer logic is shown in FIG. 9.

As stated above, normally, the write and read pointers (102,104) increment themselves within the cyclic buffer limits of the CONTINUATION area. However, when a start delimiter symbol pair is detected, the write pointer and the read pointer are both forced to leave the CONTINUATION area one after the other to address the START area ("recenter").

There are two modes in which the elasticity buffer can recenter, namely, the CONTINUE mode and the JK or FRAME mode. In the CONTINUE mode, recentering opportunities are allowed in any line states other than ALS or LSU(ALS). This includes the interframe gap. In the JK or FRAME mode, recentering occurs upon reception of a JK even though it may result in a net change in read and write address separation due to the delay-by-one mechanism (described below).

Figure 10A:
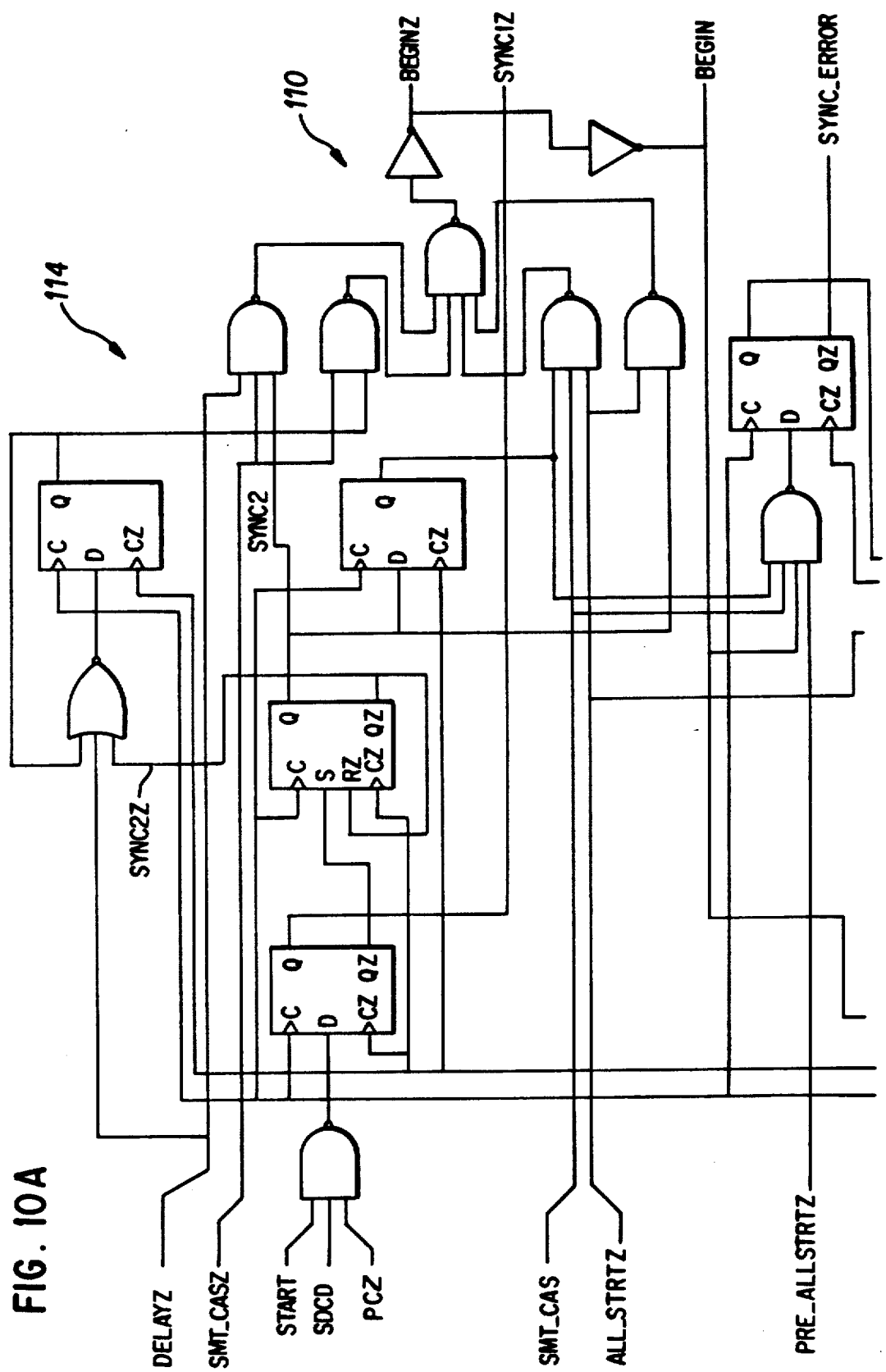
FIG. 10 is a logic diagram illustrating FRAME mode and CONTINUE mode SYNCHRO chains.
Figure 10B:
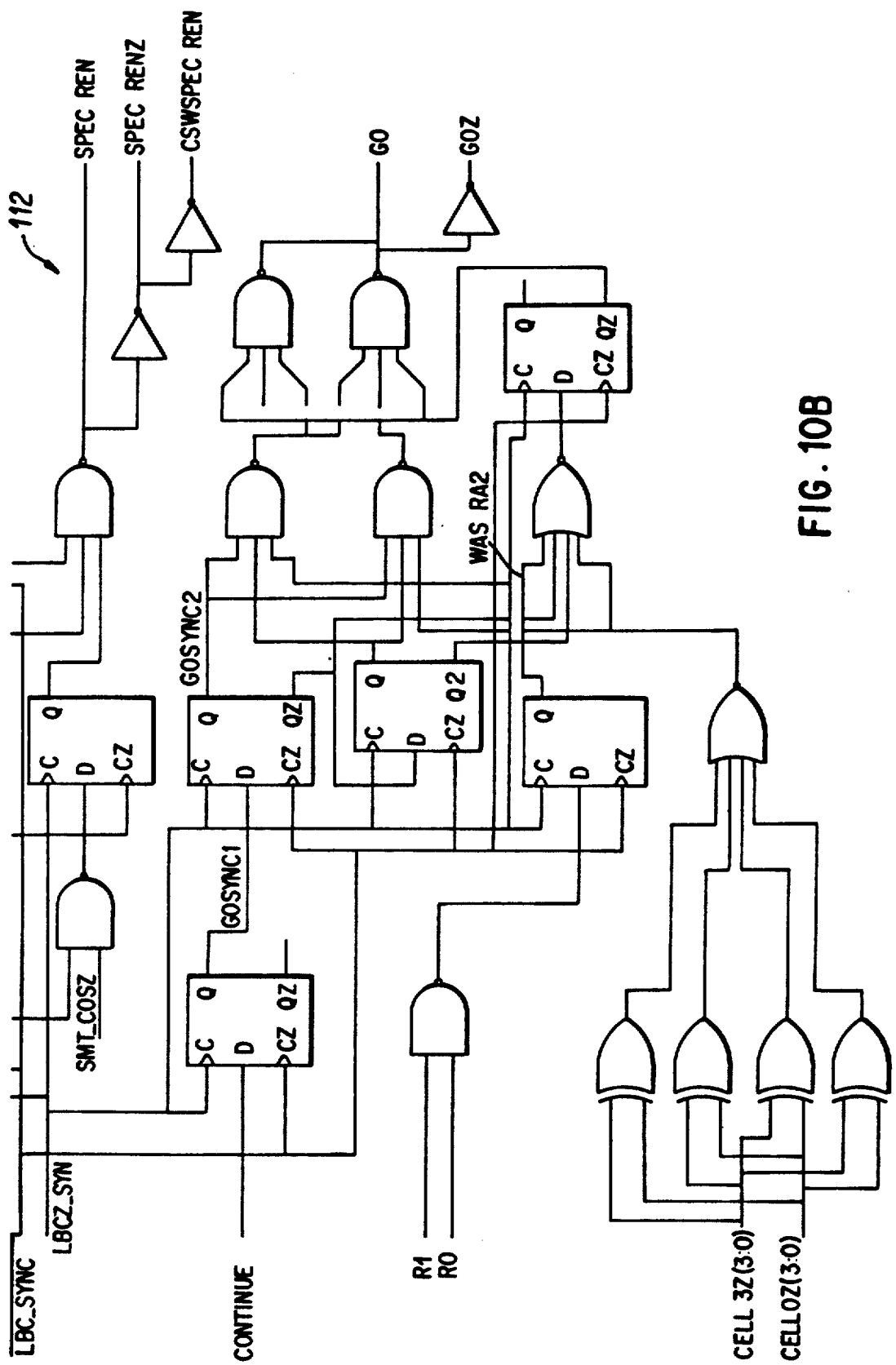

As shown in FIG. 10, flip-flop chains ("SYNCHROS") are used to reduce metastability problems caused by asynchronous sampling of received data. Each flip-flop chain allows the local byte clock to sample, at least once, a signal generated using the receive clock. At most, two samples can be made. In the case when two samples are made, the differentiating logic in the SYNCHRO insures that the SYNCHRO outputs only the output due to the first sample.

As shown in FIG. 10, there are two SYNCHRO chains and associated logic. One synchro chain 110 is used for synchronizing FRAME mode recentering; the other 112 is used for synchronizing CONTINUE mode recentering.

Both SYNCHRO flip-flops and the read pointer cyclic counter are clocked with the local byte clock falling edge. The data out of the configuration switch 34 (see FIG. 4) and, thereby the Player 10, are clocked by the rising edge of the local byte clock in order to save node delay contributed by the Player logic. The use of opposite edges of the local byte clock provides extra hidden footroom of 0.5 bytes, which more or less serves as an underflow guardband of approximately 0.5 byte of the underflow/overflow detector (described below).

The START and CONTINUE inputs to the FRAME and CONTINUATION mode SYNCHRO chains 110, 112, respectively, may be sampled at the same time. However, upon propagation to the read side outputs, the BEGIN output signal (Frame Mode) will override the GO output signal (CONTINUE Mode). Also, detection of a JK will immediately reset the CONTINUE pulse so as to prevent a late sample of the GO signal from upsetting the recently established synchronization by the BEGIN signal.

As further shown in FIG. 10, a delay-by-one-byte mechanism 114 is built into the FRAME mode SYNCHRO 110 so that an early sample of the START signal by the local clock while the read pointer 104 is well behind the writer pointer 102 will not drop the last byte of the previous frame (be it a token or a data frame) when that frame is not separated from the next start delimiter symbol pair JK by sufficient interframe gap Idle symbols (Token trashing is a common example).

The delay-by-one state machine relies on the output of a look-ahead-look-current detector 116, shown in FIG. 7. The delay-by-one mechanism 114 cannot prevent excessive separation between the write pointer and the read pointer because it can only delay by one byte (the delay-by-one mechanism 114 does not delay unnecessarily on Idles to aggravate reader/writer separation). Theoretically, bytes will start to be dropped, even with delay-by-one, when the separation between the writer pointer and the read pointer is less than or equal to three storage cells, which may result from abnormal clock skew or abnormally long frames.

Reflecting the logic provided in FIG. 10, the rules for the delay-by-one mechanism 114 for asserting the BEGIN output are as follows:

The look-ahead-look-current detection scheme 116 checks if the read pointer 104 is reading a storage element ("cell") in the memory core 100 which contains a repeatable byte (stuff byte included) in the cycle before BEGIN is supposed to be generated or if it is going to read a cell which contains a repeatable byte in the next read cycle during which BEGIN is supposed to be generated. Note that according to the chosen encoding of control bytes, those control codes that are repeatable may also be discarded. If either of the above two cases is true, then BEGIN will be generated as sampled (i.e., a repeatable byte is discarded); if not, then assertion of BEGIN waits one byte time before it can be generated (i.e., a non-repeatable byte is read), if necessary. With the help of the look-ahead-look-current scheme 116, the delay-by-one mechanism 114 is "smarter", i.e. it will not delay on top of late sampling of the START signal to cause too much initial separation between the write pointer 102 and the read pointer 104. Thus, the delay-by-one mechanism 114 prevents the last byte of a token or frame from being dropped if it is immediately followed by a fragment or another frame.

The delay-by-one mechanism also supports synchronized cascading of parallel receivers for increased throughput or fault tolerance. Details regarding the synchronized cascading feature may be obtained by reference to copending and commonly assigned U.S. patent application Ser. No. 394,445, which was filed on Aug. 16, 1989 by Perloff et al for METHOD AND APPARATUS FOR THE SYNCHRONOZATION OF A CASCADED MULTI-CHANNEL DATA TRANSMISSION, which application is hereby incorporated by reference.

As shown in FIG. 10, a delay-GO mechanism is built into the CONTINUE mode SYNCHRO 112 to prevent irregular dropping of line state bytes when the local byte clock is trapped within the metastability window of the SYNCHRO flip-flops while clock drift is infinitesimal. However, as in the case of the generation of the BEGIN signal, the delay-by-one mechanism 114 has to be "smart" enough so as not to cause too much initial separation between the write pointer 102 and the read pointer 104. This is accomplished by the read pointer 104 checking if the read address is on cell 2 just before it is about to delay the GO signal. The relationship is as follows: if the contents of cell 3 equals the contents of cell 0 and the read pointer is addressed to cell 3, then delay during first sample of the CONTINUE signal.

This takes advantage of the fact that there is no need to delay if the read pointer logic has read cell 3, nor is there need to delay if the read pointer is fast and reading cell 0. Reading cell 1 is an extremely slow process and, since the delay-by-one mechanism 114 is only one deep, we cannot do any better. If the content of cell 0 is the same as that of cell 3, then the read pointer 104 can skip cell 3 and honor GO to read cell 0 right away. No information will be lost.

As shown in FIG. 9, a stall mechanism is used to slow down a fast read pointer in the CONTINUE mode before there is a recentering opportunity. The stall mechanism works as follows: if in the 1st cycle, the read pointer reads out a repeatable symbol (I' or V') onto the RBUS from cell 3 of the elasticity buffer, then a 80 ns STALL signal forces the read pointer 104 to read cell 3 again in the current local clock cycle, that is, if GO or BEGIN or SPEC_REN or PHY INV is not asserted at the same time. Then, in the next cycle, the read pointer 104 will read from cell 0. With the help of the STALL signal, a smooth duplication of control bytes is provided. For example, instead of reading a sequence 01230101 . . . , the stall mechanism generates 01233001 . . . . The stall mechanism also decodes repeatable byte patterns from the RBUS, not RBUS1 or RBUS2. Note that RBUS1 taps the contents of the CONTINUATION section of the elasticity buffer 32, while RBUS2 taps the contents of the START area. The RBUS is the muxed tapping of RBUS1 and RBUS2, i.e. of the two elasticity buffer sections. The choice is necessary so that a "stall" does not occur after reading the SPEC cell to upset the newly established read pointer and write pointer separation, even though the cyclic address could be at cell 3 and cell 3 may contain old repeatable data. The SPEC cell does not normally contain a repeatable byte because the byte after JK cannot be repeatable unless Signal Detect or Clock Detect is lost while the JK is being processed. This cannot normally happen with JK and Signal Detect going low at the same time, since Signal Detect going low is usually preceded by QLS (but it could happen at reset time).

Upon SMT reset, the write address pointer 102 and the read address pointer 104 positions are not defined. However, after several byte clock cycles, the elasticity buffer 32 will enter the CONTINUE mode, in which there will be one recentering opportunity every 4 byte times. The reason for this is that as long as the SMT reset request is valid, the line state will be LSU(NSD). Since NSD is ~ALS, this causes the write pointer 102 to issue the synchronizing sampling signal, CON- TINUE, when it writes into elasticity buffer cell 0. Meanwhile, LSU(NSD) is read out of the elasticity buffer 32 as a repeatable byte. If this repeatable byte is read out from elasticity buffer cell 3, then the read pointer 104 will stall on cell 3 for one more byte if a sample of the CONTINUE signal has not been obtained. Reception of a sample of the CONTINUE signal causes the read pointer 104 to be "yanked" to read cell 0, regardless of which cell the read pointer 104 is currently addressing. Therefore, the read pointer 104 will be tracking the write pointer 102 within a deterministic range of delay.

As shown in FIG. 8, the write pointer 102 includes a 2-bit Johnson counter 118 and rather simple associated logic.

As shown in FIG. 9, the read pointer 104 is similar, being built around a basic 2-bit Johnson counter 120. The majority of the read select signals are integrated with the configuration switch select signals for a reduced node latency design. Johnson counters provide the benefit of being completely self-corrective.

Referring to FIG. 8, the Rules for updating the write pointer 102 are as follows:

---

1. If in (ILS/ALS) or LSU (ILS/ALS)
   if JK has been reframed
      send START to reader side to generate BEGIN
      signal; when the write pulse occurs, write
      post decoder output, i.e. a "stuff byte,"
      into the elasticity buffer cell currently
      addressed by the write pointer. Set next
      write address to point to SPEC cell. When
      the next write pulse occurs, write the post
      decoder output into the SPEC cell. After
      writing into SPEC cell, at the coming
      occurrence of receive byte clock (decoded)
      rising edge, reset the next write address
      to elasticity buffer cell 0. (The BEGIN
      signal on the reader side is a combination
      of the effect of the START pulse on the
      writer side and the delay-by-one state
      machine.)
   else
      if   (in ALS) or LSU(ALS)
          there is no particular signal sent
          from the write side to the read side.
          When the write pulse occurs, writer
          writes post decoder output into the
          elasticity buffer cell currently
          addressed by the write pointer. After
          writing into the current cell, at the
          coming occurrence of the receive byte
          clock (decoded) rising edge, increment
          the write addres; cyclically,
          (0,1,2,3,0,1,2,3 . . . ) The increment
          address is within cyclic buffer limits
          (This mode of operation defines the
          FRAME mode).
      else
          When the write pulse occurs, write
          pointer 102 writes the post decoder
          output into the elasticity buffer
          currently addressed by the write
          pointer 102. After writing into the
          current cell, at the coming occurrence
          of the receive byte clock (decoded)
          rising edge, increment the write
          address cyclically, within the cyclic
          buffer limits. But when its address
          is updated to 0, it will issue a 1.2
          byte long CONTINUE pulse to generate a
          GO signal at the read side, at which
          time the read pointer is "yanked" to
          read from cell 0, thereby refreshing
          the read pointer and write pointer
          separation every fourth byte time.
          This mechanism repeats itself until a
          JK is received in ILS. (This mode of
          operation defines the CONTINUE mode).
      Else (will not get STRETCH_JK)
2. The priority of bytes to be written into the
   elasticity buffer is such that ("stuff byte") >
   (V' | I' in −ALS) > (data | control | data-
   control mixed).
   Since arrival of a JK can be asynchronous, the
   writing of the stuff byte can also be
   asynchronous. All the rest of the possible data
   cannot overlap.

---

Referring to FIG. 9, the rules for updating the address of the read pointer 104 are as follows:

1. Read address is broken out of its cyclical updating when the read pointer 104 receives signal from the write side to change, be it GO or BEGIN. The read address is incremented on every local byte clock falling edge.
2. Upon receiving BEGIN from the write side, the read address is reset to point to ROM JK.
3. At the end of the BEGIN signal, another signal, SPEC_REN, is generated to force the read pointer to read from the SPECial RAM cell. At the end of the SPEC-REN signal, the read address will be set to point to elasticity buffer cell 0 and then incremented in a cyclical fashion thereafter until the next "BEGIN" signal arrives.
4. If read pointer 104 has just read a repeatable byte (V' or I') from elasticity buffer cell 3, then a STALL signal will be generated to force the read pointer to read the same byte from cell 3 again unless a GO signal is received from the write side. If a GO is not received after the read pointer has read cell 3 again, then the read pointer "steps off" to cell 0. Reading a repeatable byte from other elasticity buffer cells will not result in stopping at that cell. If a GO is received before or at the same time as the STALL signal, then GO will dominate. If GO is TRUE, then the read pointer reads from elasticity buffer cell 0. After this, the read address is incremented in a normal way on each local byte clock falling edge, until read address reaches 3. In all cases, the reading out of elasticity buffer data takes place right after the read address is updated.
5. The priority of bytes to be read out of the elasticity buffer is as follows:

| highest priority: | (1) PHY_INV (SMT_connect/reset) |
| --- | --- |
| | (2) JK or SPEC_REN of SPECial RAM cell |
| | (2) GO |
| | (3) PHY_INV(EB_Error) |
| | (4) STALL |
| lowest priority: | (1) CONTINUATION section contents |

Figure 11:
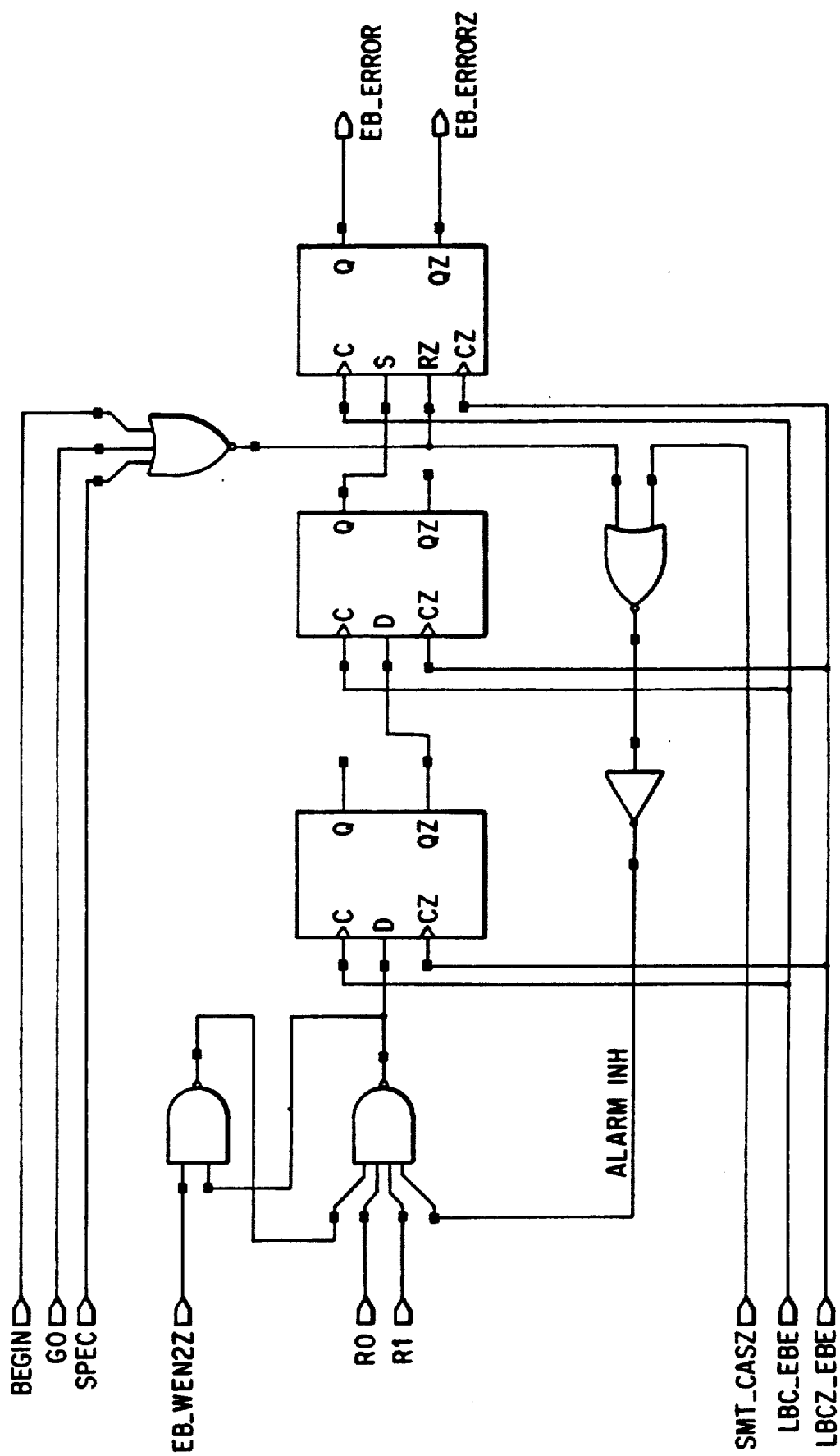
FIG. 11 is a logic diagram illustrating an elasticity buffer overflow/underflow detector.

FIG. 11 shows an elasticity buffer overflow/underflow detection scheme. Underflow and overflow cannot be distinguished from each other. The EB_Error flag is set upon overflow/underflow detection and the PHY_INV (EB Error) byte (described above) is forced out of the Player 10 via the configuration switch 16. The EB_Error flag is to be read by SMT and is cleared in the elasticity buffer 32 by reception of a BEGIN or CONTINUE signal, at which point the elasticity buffer 32 automatically recovers from this condition. It could happen that EB_Error remedies itself before the SMT has a chance to read the flag. However, once the flag is stored in the SMT interface, it is remembered until the external software clears it.

Miscellaneous rules for the elasticity buffer 32 are as follows:

1. If the read address is updated to point at cell 2 of the elasticity buffer when the write pointer 102 is enabling the write into cell 2, or when the write pointer 102 enables write into cell 2 when the read address has been pointing at cell 2, at the earliest local byte clock rising, an elasticity buffer overflow/underflow error flag is set and registered at the SMT interface. There is no differentiation between overflow and underflow. Internally, the flag can be reset once the receiver 12 receives a new frame or enters the CONTINUE mode. Collision of read pointer 104 and write pointer 102 in any cell other than cell 2 will not be detected.

2. The margin for underflow is (2 CMOS gate delays + 5 bit time + LBC clock skew). The margin for overflow does not exist. In fact, it is not until the collision is 2 gate delays into time that it may be detected. However, the elasticity buffer is designed with much more room in the overflow direction.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. An elasticity buffer utilizable in a network station for synchronizing the writing of received information characters to elasticity buffer storage in accordance with the cycles of a receive clock signal recovered from an input signal to the network station, the input signal including the received information characters, and the reading from elasticity buffer storage of stored received information characters in accordance with the cycles of a local clock signal generated at the network station, the elasticity buffer comprising:

(a) a core memory that includes a first section comprising a first plurality of sequentially-arranged storage elements for storing information characters and a second section comprising a second plurality of sequentially-arranged storage elements for storing information characters;

(b) write pointer means responsive to a predetermined write signal provided at a write initiate cycle of the receive clock signal for initiating the sequential writing of information characters to the core memory beginning with a first preselected storage element of the first section and continuing sequentially first through the storage elements of the first section subsequent to the first preselected storage element and then through the sequentially-arranged storage elements of the second section;

(c) read pointer means responsive to a predetermined read-start signal provided at a read initiate cycle of the local clock signal, the read initiate cycle being subsequent to the write initiate cycle, for initiating the reading of information characters from the core memory beginning with a second preselected storage element prior to the first preselected storage element in the sequence of storage element comprising the first section and continuing sequentially through the storage elements of the first section subsequent to the second preselected storage element and then through the sequentially-arranged storage elements of the second section;

(d) recentering means connected to the write pointer means and to the read pointer means and responsive to a first specified characteristic of the sequence of information characters for routing the write pointer means to the first preselected storage element of the first section and the read pointer means to the second preselected storage element of the first section; and (e) delay-by-one means connected to the recentering means and responsive to a second specified characteristic of the sequence of information characters for delaying the routing of the read pointer means to the second preselected storage element of the first section.

2. An elasticity buffer as in claim 1 wherein the delay-by-one means is responsive to the second specified characteristic of the sequence of information characters for delaying the routing of the read pointer means by one cycle of the local clock signal.

3. An elasticity buffer as in claim 1 wherein the first specified characteristic of the sequence of information characters is the occurrence of a start delimiter in said sequence.

4. An elasticity buffer as in claim 3 wherein the second specified characteristic of the sequence of information characters is the occurrence of an interframe gap in said sequence wherein said interframe gap consists of a continuous plurality of a predetermined type of information character less than or equal to the second plurality of storage elements comprising the second section of the memory core.

5. An elasticity buffer as in claim 1 and further comprising look-ahead-look-current detector means connected to the delay-by-one means and response to features of the second specified characteristic for enabling the delay-by-one means to delay the routing of the read pointer means to the second preselected storage element of the first section.

6. A method of synchronizing the writing of received information characters to elasticity buffer storage of a network station in accordance with the cycles of a receive clock signal recovered from an input signal to the network station, the input signal including the received information characters, and the reading from elasticity buffer storage of stored received information characters in accordance with the cycles of a local clock signal generated at the network station, the elasticity buffer storage comprising a core memory that includes a first section comprising a first plurality of sequentially-arranged storage elements for storing information characters and a second section comprising a second plurality of sequentially-arranged storage elements for storing information characters, the method comprising:

(a) in response to a predetermined write signal provided at a write initiate cycle of the receive clock signal, initiating the sequential writing of information characters to the core memory beginning with a first preselected storage element of the first section and continuing sequentially first through the storage elements of the first section subsequent to the first preselected storage element and then through the sequentially-arranged storage elements of the second section;

(b) in response to a predetermined read-start signal provided at a read initiate cycle of the local clock signal, the read initiate cycle being subsequent to the write initiate cycle, initiating the reading of information characters from the core memory beginning with a second preselected storage element prior to the first preselected storage element in the sequence of storage elements comprising the first section and continuing sequentially through the storage elements of the first section subsequent to the second preselected storage element and then through the sequentially-arranged storage elements of the second section;

(c) in response to a first specified characteristic of the sequence of information characters, routing a write pointer means to the first preselected storage element of the first section and a read pointer means to the second preselected storage element of the first section; and (d) in response to a second specified characteristic of the sequence of information characters, delaying the routing of the read pointer means to the second preselected storage element of the first section.

7. A method as in claim 6 wherein the routing of the read pointer means is delayed by one cycle of the local clock signal.

8. A method as in claim 6 wherein the first specified characteristic of the sequence of information characters is the occurrence of a start delimiter in said sequence.

9. A method as in claim 8 wherein the second specified characteristic of the sequence of information characters is the occurrence of an interframe gap in said sequence wherein said interframe gap consists of a continuous plurality of a specified type of information character less than or equal to the second plurality of storage elements comprising the second section of the memory core.

10. A method as in claim 6 wherein the delay of the routing of the read pointer means to the second preselected storage element of the first section is enabled in response to identification of features of the second specified characteristic.

* * * * *